US 11,239,462 B2

(12) United States Patent
Hoshina et al.

(10) Patent No.: US 11,239,462 B2
(45) Date of Patent: Feb. 1, 2022

(54) NONAQUEOUS ELECTROLYTE BATTERY AND BATTERY PACK

(71) Applicants: KABUSHIKI KAISHA TOSHIBA, Minato-ku (JP); Toshiba Infrastructure Systems & Solutions Corporation, Kawasaki (JP)

(72) Inventors: Keigo Hoshina, Kashiwazaki (JP); Ryo Hara, Kashiwazaki (JP); Dai Yamamoto, Kashiwazaki (JP); Yasuhiro Harada, Isehara (JP); Norio Takami, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 209 days.

(21) Appl. No.: 16/257,230

(22) Filed: Jan. 25, 2019

(65) Prior Publication Data

US 2019/0198871 A1 Jun. 27, 2019

Related U.S. Application Data

(63) Continuation of application No. PCT/JP2016/072380, filed on Jul. 29, 2016.

(51) Int. Cl.
*H01M 4/485* (2010.01)
*H01M 4/131* (2010.01)
(Continued)

(52) U.S. Cl.
CPC ............ *H01M 4/485* (2013.01); *C01G 33/00* (2013.01); *C01G 33/006* (2013.01);
(Continued)

(58) Field of Classification Search
CPC ........ H01M 4/485; H01M 4/36; H01M 4/525; H01M 4/131; H01M 4/505; H01M 4/364;
(Continued)

(56) References Cited

U.S. PATENT DOCUMENTS

| 10,096,827 B2 | 10/2018 | Harada et al. |
| 2009/0136850 A1 | 5/2009 | Yoon et al. |

(Continued)

FOREIGN PATENT DOCUMENTS

| EP | 2 980 890 A1 | 2/2016 |
| JP | 4237659 | 3/2009 |

(Continued)

OTHER PUBLICATIONS

International Search Report dated Sep. 20, 2016 in PCT/JP2016/072380 filed on Jul. 29, 2016 (with English Translation).

(Continued)

*Primary Examiner* — Haixia Zhang
(74) *Attorney, Agent, or Firm* — Oblon, McClelland, Maier & Neustadt, L.L.P.

(57) ABSTRACT

A nonaqueous electrolyte battery according to one embodiment includes a negative electrode, a positive electrode and a nonaqueous electrolyte. The negative electrode includes a negative electrode active material-containing layer. The negative electrode active material-containing layer contains a negative electrode active material containing an orthorhombic Na-containing niobium titanium composite oxide. The positive electrode includes a positive electrode active material-containing layer. The positive electrode active material-containing layer contains a positive electrode active material. A mass C [g/m$^2$] of the positive electrode active material per unit area of the positive electrode and a (Continued)

mass A [g/m$^2$] of the negative electrode active material per unit area of the negative electrode satisfy the formula (1): $0.95 \leq A/C \leq 1.5$.

8 Claims, 7 Drawing Sheets

(51) Int. Cl.
  *H01M 4/505* (2010.01)
  *H01M 4/36* (2006.01)
  *C01G 33/00* (2006.01)
  *H01M 4/525* (2010.01)

(52) U.S. Cl.
  CPC .............. *H01M 4/131* (2013.01); *H01M 4/36* (2013.01); *H01M 4/505* (2013.01); *H01M 4/525* (2013.01); *C01P 2004/38* (2013.01); *C01P 2006/40* (2013.01)

(58) Field of Classification Search
  CPC ............ H01M 4/5825; H01M 10/0525; C01G 33/00; C01G 33/006; C01P 2004/38; C01P 2006/40
  See application file for complete search history.

(56) References Cited

U.S. PATENT DOCUMENTS

| | | |
|---|---|---|
| 2013/0095391 A1 | 4/2013 | Baba et al. |
| 2013/0323607 A1* | 12/2013 | Issaev ................... H01M 4/382 429/338 |
| 2016/0036040 A1 | 2/2016 | Takami et al. |
| 2016/0036090 A1 | 2/2016 | Sasakawa et al. |
| 2016/0141615 A1 | 5/2016 | Nakayama et al. |
| 2017/0162872 A1 | 6/2017 | Takami et al. |
| 2017/0170469 A1 | 6/2017 | Inagaki et al. |
| 2017/0179486 A1 | 6/2017 | Saruwatari et al. |

FOREIGN PATENT DOCUMENTS

| | | |
|---|---|---|
| JP | 2009-266438 A | 11/2009 |
| JP | 2013-77424 | 4/2013 |
| JP | 2016-033888 | 3/2016 |
| JP | 2016-171071 | 9/2016 |
| WO | WO 2015/019922 A1 | 2/2015 |
| WO | WO 2016/068286 A1 | 5/2016 |
| WO | WO 2016/084200 A1 | 6/2016 |
| WO | WO 2016/088193 A1 | 6/2016 |

OTHER PUBLICATIONS

Written Opinion dated Sep. 20, 2016 in PCT/JP2016/072380 filed on Jul. 29, 2016.

Muto, F., et al., "Hydrothermal Synthesis of Sodium Lithium Titanates and their Crystal Structures", Journal of the Chemical Society of Japan, 1977, No. 4, pp. 492 to 499 (with English Abstract).

Extended European Search Report dated Mar. 16, 2020 in European Patent Application No. 16910570.7, 10 pages.

Lao, M., et al., "Enhanced lithium storage property of Na-doped $Li_2Na_2Ti_6O_{14}$ anode materials for secondary lithium-ion batteries", RSC Advances, 2015, vol. 5, pp. 41999-42008.

* cited by examiner

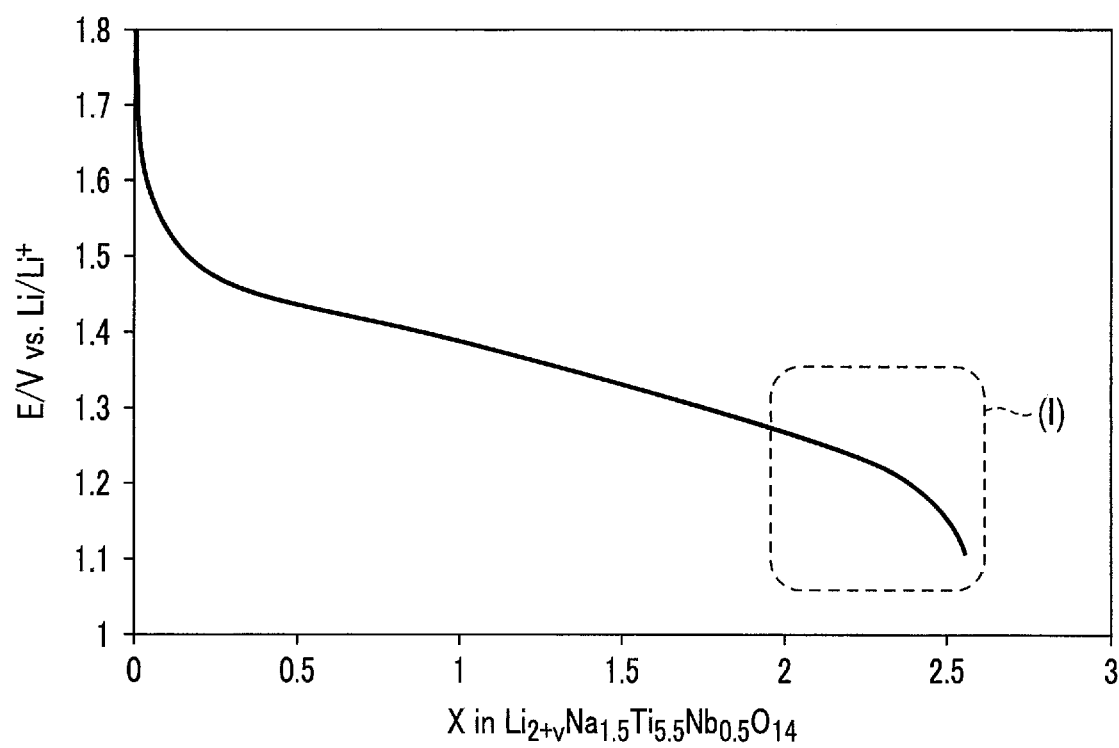
F I G. 1

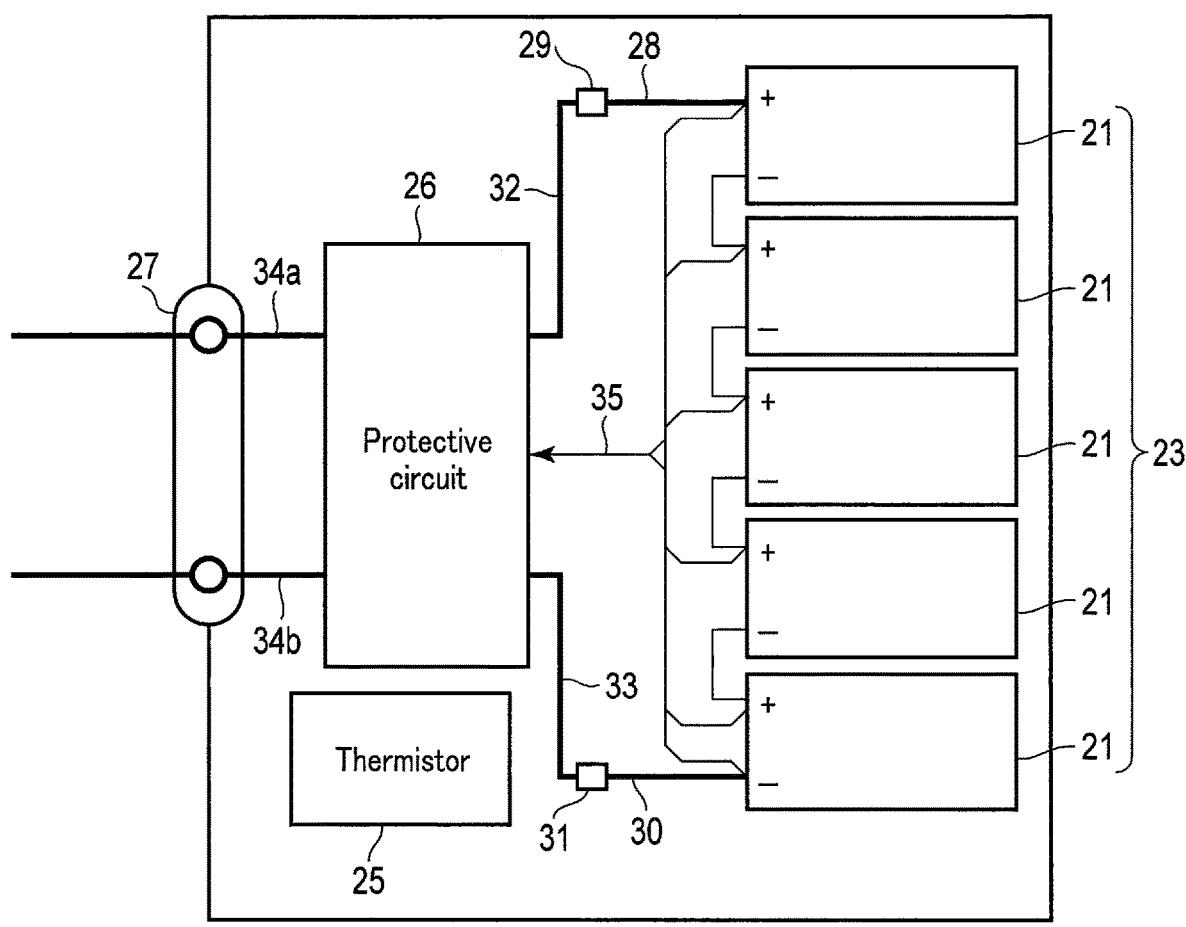
F I G. 8

NONAQUEOUS ELECTROLYTE BATTERY AND BATTERY PACK

CROSS-REFERENCE TO RELATED APPLICATIONS

This application is a Continuation Application of PCT Application No. PCT/JP2016/072380, filed Jul. 29, 2016, the entire contents of which are incorporated herein by reference.

FIELD

Embodiments described herein relate to a nonaqueous electrolyte battery and a battery pack.

BACKGROUND

A nonaqueous electrolyte battery charged and discharged by movement of lithium ions between a negative electrode and a positive electrode has been actively researched as a high energy density battery.

The nonaqueous electrolyte battery is expected to be utilized also as medium or large size power sources, such as onboard applications and stationary applications, as well as power sources for small size electronic devices. Cycle life characteristics and high stability are required in such medium or large size applications. Further, in these applications, high input-and-output characteristics are also required.

As an example of nonaqueous electrolyte batteries having cycle life characteristics and high stability, a nonaqueous electrolyte battery using spinel-type lithium titanate in a negative electrode has been known. However, since spinel-type lithium titanate has a high lithium insertion-and-extraction potential of approximately 1.55 V (vs. Li/Li$^+$), the battery voltage of the nonaqueous electrolyte battery using spinel-type lithium titanate in the negative electrode is low. Further, spinel-type lithium titanate has such a feature that in lithium insertion-and-extraction potential ranges, a change in potential accompanying a change in state-of-charge is very small. That is, charge-and-discharge curves of the spinel-type lithium titanate include a flat portion of the potential in the lithium insertion-and-extraction potential ranges.

BRIEF DESCRIPTION OF THE DRAWINGS

FIG. 1 is a graph showing a relationship between a lithium insertion amount and an operating potential for an example of an orthorhombic Na-containing niobium titanium composite oxide;

FIG. 8 is a block diagram showing an electric circuit of the battery pack of FIG. 7;

DETAILED DESCRIPTION

Figure 2:
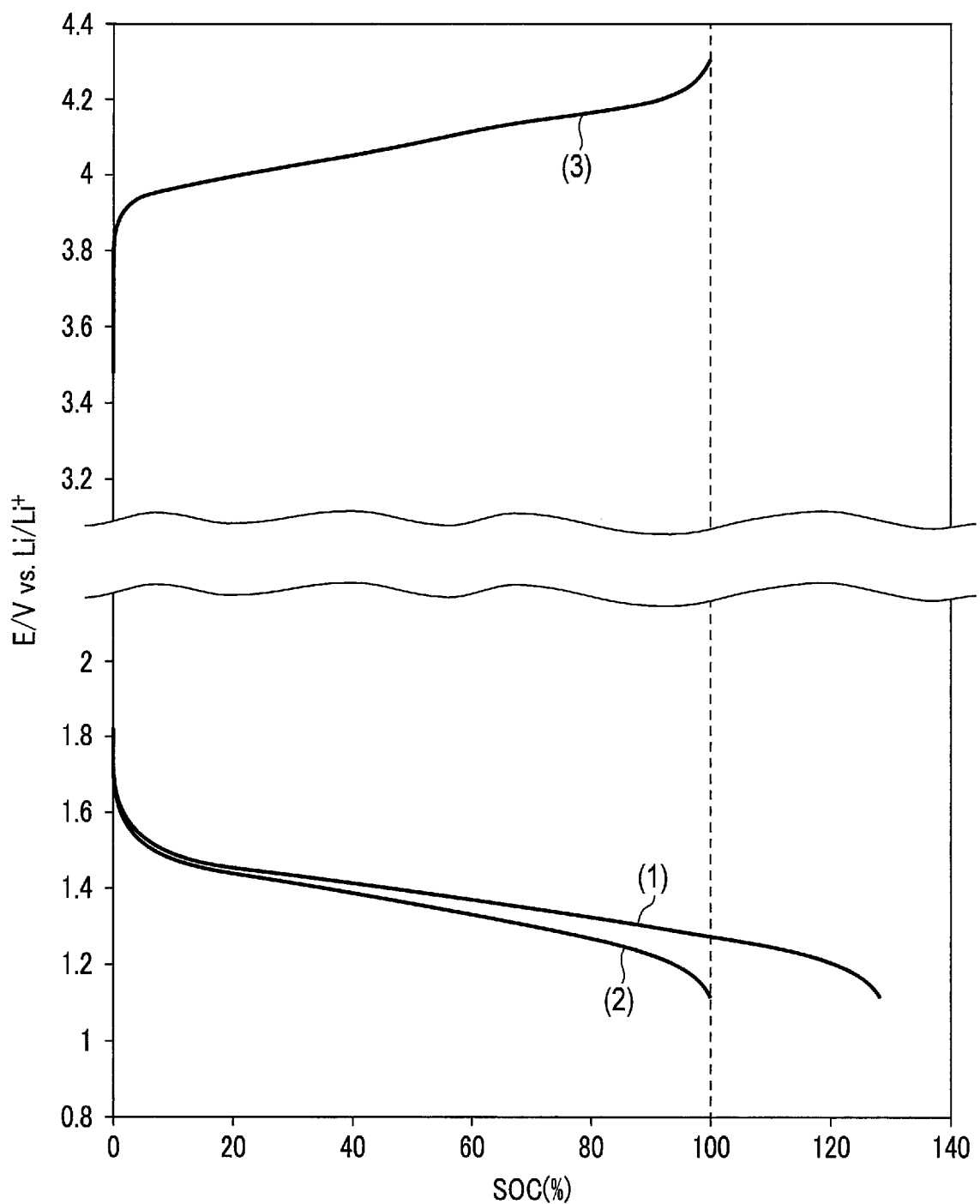
FIG. 2 is a graph showing charge curves of a positive electrode and a negative electrode included in a nonaqueous electrolyte battery of a first example according to a first embodiment and charge curves of a positive electrode and a negative electrode included in a nonaqueous electrolyte battery of a reference example.

According to an embodiment, a nonaqueous electrolyte battery is provided. The nonaqueous electrolyte battery includes a negative electrode, a positive electrode and a nonaqueous electrolyte. The negative electrode includes a negative electrode current collector and a negative electrode active material-containing layer provided on the negative electrode current collector. The negative electrode active material-containing layer contains a negative electrode active material containing an orthorhombic Na-containing niobium titanium composite oxide. The orthorhombic Na-containing niobium titanium composite oxide is represented by a general formula of $Li_{2+v}Na_{2-y}M1_xTi_{6-y-z}nb_yM2_zO_{14+\delta}$. In the general formula, M1 is at least one selected from the group consisting of Cs, K, Sr, Ba and Ca, M2 is at least one selected from the group consisting of Zr, Sn, V, Ta, Mo, W, Fe, Co, Mn and Al, and $0 \le v < 2$, $0 \le x < 2$, $0.1 \le y \le 0.8$, $0 \le z < 3$, and $-0.5 \le \delta \le 0.5$. The positive electrode includes a positive electrode current collector and a positive electrode active material-containing layer provided on the positive electrode current collector. The positive electrode active material-containing layer contains a positive electrode active material. A mass C [g/m$^2$] of the positive electrode active material per unit area of the positive electrode and a mass A [g/m$^2$] of the negative electrode active material per unit area of the negative electrode satisfy the formula (1): $0.95 \le A/C \le 1.5$.

According to an embodiment, a battery pack is provided. The battery pack includes the nonaqueous electrolyte battery according to the embodiment.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, a nonaqueous electrolyte battery is provided. The nonaqueous electrolyte battery includes a negative electrode, a positive electrode, and a nonaqueous electrolyte. The negative electrode includes a negative electrode current collector and a negative electrode active material-containing layer provided on the negative electrode current collector. The negative electrode active material-containing layer contains a negative electrode active material which contains an orthorhombic Na-containing niobium titanium composite oxide. The orthorhombic Na-containing niobium titanium composite oxide is represented by a general formula of $Li_{2+v}Na_{2-y}M1_xTi_{6-y-z}$ $Nb_yM2_zO_{14+\delta}$. In this general formula, M1 is at least one selected from the group consisting of Cs, K, Sr, Ba and Ca, M2 is at least one selected from the group consisting of Zr, Sn, V, Ta, Mo, W, Fe, Co, Mn and Al, and $0 \leq v < 2$, $0 \leq x < 2$, $0.1 \leq y \leq 0.8$, $0 \leq z < 3$, and $-0.5 \leq \delta \leq 0.5$. The positive electrode includes a positive electrode current collector and a positive electrode active material-containing layer provided on the positive electrode current collector. The positive electrode active material-containing layer contains a positive electrode active material. A mass C [g/m$^2$] of the positive electrode active material per unit area of the positive electrode and a mass A [g/m$^2$] of the negative electrode active material per unit area of the negative electrode satisfy the formula (1): $0.95 \leq A/C \leq 1.5$.

The orthorhombic Na-containing niobium titanium composite oxide represented by, for example, the general formula of $Li_{2+v}Na_{2-y}M1_xTi_{6-y-z}Nb_yM2_zO_{14+\delta}$ is a composite oxide capable of inserting and extracting lithium at a low potential among titanium oxides. For example, a lithium sodium titanium composite oxide represented by the above general formula can exhibit a lithium insertion-and-extraction potential within the range of 1.2 to 1.4 V, that is, an operating potential.

For example, the orthorhombic Na-containing niobium titanium composite oxide represented by the general formula $Li_{2+v}Na_{2-y}M1_xTi_{6-y-z}Nb_yM2_zO_{14+\delta}$ can exhibit a large potential change in the above operating potential range, as the state-of-charge changes.

Thus, a nonaqueous electrolyte battery using the orthorhombic Na-containing niobium titanium composite oxide in the negative electrode can exhibit a higher battery voltage than that of a nonaqueous electrolyte battery using lithium titanate in the negative electrode, and the state-of-charge can be easily grasped based on a change in potential.

However, as a result of earnest research, the inventors have found that the nonaqueous electrolyte battery using the orthorhombic Na-containing niobium titanium composite oxide in the negative electrode has a problem of exhibiting a high resistance value in a high state-of-charge.

As a result of further studies to solve this problem, the inventors have found that, as described below by way of example, the orthorhombic Na-containing niobium titanium composite oxide exhibites high resistance in a high state-of-charge, and this is one cause that the nonaqueous electrolyte battery using the orthorhombic Na-containing niobium titanium composite oxide in the negative electrode exhibits a high resistance value in a high state-of-charge.

FIG. 1 is a graph showing a relationship between a lithium insertion amount and an operating potential for $Li_{2+v}Na_{1.5}Ti_{5.5}Nb_{0.5}O_{14}$ an an example of an orthorhombic Na-containing niobium titanium composite oxide. The graph shown in FIG. 1 is a graph obtained by charging a three-electrode cell manufacutred using, as a working electrode, an electrode containing $Li_{2+v}Na_{1.58}Ti_{5.5}Nb_{0.5}O_{14}$ which is an example of the orthorhombic Na-containing niobium titanium composite oxide and using Li metal as a counter electrode and a reference electrode. Specifically, this three-electrode cell was charged at a constant current of a current density of 0.1 mA/cm$^2$ at 25° C. until the potential of the working electrode reached 1.1 V (vs. Li/Li$^+$). The charge capacity at each potential during the charging was converted as the amount of Li inserted into the orthorhombic Na-containing niobium titanium composite oxide, and the graph of FIG. 1 showing the relationship between the lithium insertion amount and the potential was obtained.

As is apparent from FIG. 1, when the three-electrode cell is charged to a potential of 1.1 V (vs. Li/Li$^+$), Li can be inserted into the orthorhombic Na-containing niobium titanium composite oxide $Li_{2+v}Na_{1.5}Ti_{5.5}Nb_{0.5}O_{14}$ so that the composition formula changes to about $Li_{4.5}Na_{1.5}Ti_{5.5}Nb_{0.5}O_{14}$.

On the other hand, the inventors found that the orthorhombic Na-containing niobium titanium composite oxide $Li_{2+v}Na_{1.5}ti_{5.5}Nb_{0.5}O_{14}$ exhibited a high resistance value in a state where the Li amount in the crystal structure increased as compared to a state represented by the composition formula of $Li_4Na_{1.5}Ti_{5.5}Nb_{0.5}O_{14}$, that is, a state where the value of the subscript v was 2. In FIG. 1, a portion corresponding to a state exhibiting a high resistance value is denoted by a symbol I. The potential of the orthorhombic Na-containing niobium titanium composite oxide $Li_{2+v}Na_{1.5}Ti_{5.5}Nb_{0.5}O_{14}$ in a state exhibiting a high resistance value is not more than 1.27 V (vs. Li/Li$^+$).

As a result of studies based on this finding, the present inventors have achieved the nonaqueous electrolyte battery according to the first embodiment.

The nonaqueous electrolyte battery according to the first embodiment in which the mass ratio A/C of the active materials is not less than 0.95 can suppress that the orthorhombic Na-containing niobium titanium composite oxide represented by the general formula of $Li_{2+v}Na_{2-y}M1_xTi_{6-y-z}Nb_yM2_zO_{14+\delta}$ enters the high resistance state. The reason will be described below with reference to the drawings, taking an example.

FIG. 2 shows charge curves of a positive electrode and a negative electrode included in a nonaqueous electrolyte battery of a first example according to the first embodiment and charge curves of a positive electrode and a negative electrode included in a nonaqueous electrolyte battery of a reference example.

Both the nonaqueous electrolyte battery of the first example and the nonaqueous electrolyte battery of the reference example use an orthorhombic Na-containing niobium titanium composite oxide $Li_2Na_{1.5}Ti_{5.5}Nb_{0.5}O_{14}$ as a negative electrode active material and $Li_{1.05}Mn_{1.8}Al_{0.05}O_4$ as a positive electrode active material. The nonaqueous electrolyte battery of the first example includes a positive electrode and a negative electrode produced such that the mass ratio A/C of the active materials is 1.17. On the other hand, the nonaqueous electrolyte battery of the reference example includes a positive electrode and a negative electrode produced such that the mass ratio A/C of the active materials is 0.88.

FIG. 2 shows, as a curve (1), the charge curve of the negative electrode included in the nonaqueous electrolyte battery of the first example. FIG. 2 further shows, as a curve (2), the charge curve of, the negative electrode included in the nonaqueous electrolyte battery of the reference example. On the other hand, the charge curves of the positive electrodes were similar between the nonaqueous electrolyte battery of the first example and the nonaqueous electrolyte battery of the reference example. Thus, FIG. 2 shows, as a curve (3), the charge curve of the positive electrode included in each of the nonaqueous electrolyte batteries. In the graph of FIG. 2, the horizontal axis represents the state-of-charge (SOC) of each battery, and the vertical axis represents the potential of each positive electrode and negative electrode with respect to the lithium potential. The nonaqueous electrolyte battery of the first example and the nonaqueous electrolyte battery of the reference example were charged at a current density of 0.1 mA/cm$^2$ at 25° C., respectively. For the nonaqueous electrolyte battery of the first example, the capacity of the battery charged until the voltage reached 3.1 V was defined as SOC 100%. On the other hand, for the nonaqueous electrolyte battery of the reference example, the capacity of the battery charged until the voltage reached 3.2 V was defined as SOC 100%. The curve (1) also includes the behavior when the negative electrode of the nonaqueous electrolyte battery of the first example is charged to not less than SOC 100%.

As is apparent from FIG. 2, in the nonaqueous electrolyte battery of the first example in which the mass ratio A/C of the active materials is 1.17, the high resistance state where the potential of the negative electrode is not more than 1.27 V (vs. Li/Li$^+$) corresponds to a state-of-charge exceeding 100%. In the nonaqueous electrolyte battery of the first example, as is apparent from the curve (3) in FIG. 2, when the state-of-charge approaches 100%, the positive electrode potential rises steeply, so that the battery voltage rises steeply. Thus, by monitoring the battery voltage in the nonaqueous electrolyte battery of the first example, it is possible to easily stop charging before the state-of-charge reaches 100%. Thus, even when the nonaqueous electrolyte battery of the first example enters a high state-of-charge, the negative electrode can be prevented from entering the high resistance state.

On the other hand, as is apparent from FIG. 2, in the nonaqueous electrolyte battery of the reference example in which the mass ratio A/C of the active materials is 0.88, the potential of the negative electrode is not more than 1.27 V (vs. Li/Li$^+$) even in a state-of-charge slightly lower than 100%. Thus, in the nonaqueous electrolyte battery of the reference example, the negative electrode enters the high resistance state even before the state-of-charge reaches 100%.

When a nonaqueous electrolyte battery in which the mass ratio A/C of the active materials is not less than 0.95 is used, similarly to the nonaqueous electrolyte battery of the first example, the negative electrode can be prevented from entering a high state-of-charge even in the state-of-charge of 100%. Thus, such a nonaqueous electrolyte battery can prevent resistance from rising even in a high state-of-charge, and as a result, the nonaqueous electrolyte battery can exhibit excellent input-and-output characteristics.

In addition, as the mass ratio A/C of the active materials is higher, the state-of-charge of the nonaqueous electrolyte battery whose negative electrode is in a high resistance state can be made higher. However, if the mass ratio A/C is too high, the energy density of the nonaqueous electrolyte battery lowers. The nonaqueous electrolyte battery according to the first embodiment in which the mass ratio A/C of the active materials is from 0.95 to 1.5 can exhibit both excellent input-and-output characteristics and high energy density.

Next, the nonaqueous electrolyte battery according to the first embodiment will be described in more detail.

The nonaqueous electrolyte battery according to the first embodiment includes a negative electrode, a positive electrode, and a nonaqueous electrolyte.

The negative electrode includes a negative electrode current collector and a negative electrode active material-containing layer provided on the negative electrode current collector.

The negative electrode current collector can have, for example, two oppositely facing surfaces. The negative electrode current collector can support the negative electrode active material-containing layer only on one surface thereof or can support the negative electrode active material-containing layer on both surfaces thereof. The negative electrode current collector may include a portion where the negative electrode active material-containing layer is not supported on a surface. This portion may serve as a negative electrode tab, for example. Alternatively, the negative electrode may include a negative electrode tab which is separate from the negative electrode current collector.

The negative electrode active material-containing layer contains a negative electrode active material containing an orthorhombic Na-containing niobium titanium composite oxide. The orthorhombic Na-containing niobium titanium composite oxide is represented by a general formula of $Li_{2+v}Na_{2-y}M1_xTi_{6-y-z}Nb_yM2_zO_{14+\delta}$.

In the above general formula, the subscript v varies within the range of $0 \le v < 2$, depending on the state of charge of the orthorhombic Na-containing niobium titanium composite oxide.

In the above general formula, M1 is at least one selected from the group consisting of Cs, K, Sr, Ba and Ca. If the orthorhombic Na-containing niobium titanium composite oxide contains Cs, more excellent cycle characteristics can be realized. If the orthorhombic Na-containing niobium titanium composite oxide contains K, more excellent cycle characteristics can be realized. If the orthorhombic Na-containing niobium titanium composite oxide contains Sr, more excellent rate characteristics can be realized. If the orthorhombic Na-containing niobium titanium composite oxide contains Ba, more excellent rate characteristics can be realized. If the orthorhombic Na-containing niobium titanium composite oxide contains Ca, more excellent rate characteristics can be realized. M1 more preferably contains at least one of Sr and Ba.

In the above general formula, the subscript x takes a value within the range of $0 \le x < 2$. When the orthorhombic Na-containing niobium titanium composite oxide contains M1 such that the subscript x is not less than 2, it is difficult to obtain a single-phase crystalline phase, and, in addition, the lithium diffusibility in the solid decreases to lower the input-and-output characteristics. It is preferable that the subscript x take a value within the range of from 0.05 to 0.2. The orthorhombic Na-containing niobium titanium composite oxide in which the subscript x falls within this range can exhibit more excellent rate characteristics.

In the above general formula, the subscript y takes a value within the range of $0.1 \le y \le 0.8$. A nonaqueous electrolyte battery containing, at the negative electrode, an orthorhombic Na-containing niobium titanium composite oxide in which the value of the subscript y is smaller than 0.1 exhibits high resistance in a high state-of-charge where the SOC is close to 100%. Regarding this, refer to the result of Comparative Example 8 shown later. On the other hand, when the value of the subscript y is larger than 0.8, a reversible charge-and-discharge capacity decreases, and the input-and-output characteristics are also lowered. It is preferable that the subscript y take a value within the range of from 0.1 to 1. The orthorhombic Na-containing niobium titanium composite oxide in which the value of the subscript y falls within this range can exhibit more excellent rate characteristics.

M2 is at least one selected from the group consisting of Zr, Sn, V, Ta, Mo, W, Fe, Co, Mn and Al. If the orthorhombic Na-containing niobium titanium composite oxide contains Zr, more excellent cycle characteristics can be realized. If the orthorhombic Na-containing niobium titanium composite oxide contains Sn, more excellent rate characteristics can be realized. V and Ta can exhibit the same physical and chemical properties as Nb. If the orthorhombic Na-containing niobium titanium composite oxide contains Mo, more excellent rate characteristics can be realized. If the orthorhombic Na-containing niobium titanium composite oxide contains W, more excellent rate characteristics can be realized. If the orthorhombic Na-containing niobium titanium composite oxide contains Fe, more excellent cycle characteristics can be realized. If the orthorhombic Na-containing niobium titanium composite oxide contains Co, more excellent cycle characteristics can be realized. If the orthorhombic Na-containing niobium titanium composite oxide contains Mn, more excellent cycle characteristics can be realized. If the orthorhombic Na-containing niobium titanium composite oxide contains Al, more excellent rate characteristics can be realized. M2 more preferably contains at least one selected from the group consisting of Al, Zr, Sn and V. In another preferred aspect, M2 is at least one selected from the group consisting of Sn, V, Ta, Mo, W, Fe, Co and Mn.

In the above general formula, the subscript z takes a value within the range of $0 \leq z < 3$. When the orthorhombic Na-containing niobium titanium composite oxide contains M2 such that the value of the subscript z is not less than 3, it is difficult to obtain a single-phase crystalline phase, and, in addition, the lithium diffusibility in the solid decreases to lower the input-and-output characteristics. It is preferable that the subscript z take a value within the range of 0.1 to 0.3. The orthorhombic Na-containing niobium titanium composite oxide in which the value of the subscript z falls within this range can exhibit more excellent rate characteristics.

The subscript δ takes a value within the range of $-0.5 \leq \delta \leq 0.5$. When the value of the subscript δ is smaller than −0.5, charge-and-discharge cycle characteristics are lowered. On the other hand, when the value of the subscript δ is larger than 0.5, it is difficult to obtain a single-phase crystalline phase, and impurities are easily generated. It is preferable that the subscript δ take a value within the range of $-0.1 \leq \delta \leq 0.1$. The orthorhombic Na-containing niobium titanium composite oxide in which the value of the subscript δ falls within this range can exhibit more excellent rate characteristics and more excellent cycle characteristics.

The negative electrode active material may contain a negative electrode active material other than the orthorhombic Na-containing niobium titanium composite oxide. The mass of the orthorhombic Na-containing niobium titanium composite oxide in the negative electrode active material is preferably not less than 70%, more preferably not less than 80%, with respect to the mass of the negative electrode active material.

Examples of the negative electrode active material other than the orthorhombic Na-containing niobium titanium composite oxide include $Li_4Ti_5O_{12}$, $TiNb_2O_7$, $TiO_2(B)$, $Li_2Na_2Ti_6O_{14}$, and $Li_2SrTi_6O_{14}$.

The negative electrode active material may have, for example, a particle shape. The particles of the negative electrode active material may be primary particles or may contain secondary particles as aggregates of primary particles. Alternatively, the particles of the negative electrode active material may be a mixture of primary particles and secondary particles. Further, carbon may adhere to the surface of the particles of the negative electrode active material. The carbon may adhere to the surface of the primary particle or the surface of the secondary particle. Alternatively, the particles of the negative electrode active material may contain secondary particles formed by aggregation of primary particles to which carbon adheres to the surface. Such secondary particles can exhibit excellent conductivity because carbon exists between the primary particles. An aspect containing such secondary particles is preferable because the electrode layer can exhibit lower resistance.

An average primary particle size of the particles of the negative electrode active material falls preferably within a range from 0.5 μm to 3 μm, and more preferably within a range from 0.9 μm to 2 μm. An average secondary particle size of the particles of the negative electrode active material falls preferably within a range from 5 μm to 20 μm, and more preferably within a range from 8 μm to 12 μm. These preferred particle sizes are particle sizes of the negative electrode active material particles not containing carbon. For particles containing carbon, the average primary particle size falls preferably within a range from 0.8 μm to 3 μm, and more preferably within a range from 1 μm to 2 μm. The average secondary particle size falls preferably within a range from 5 μm to 25 μm and more preferably within a range from 8 μm to 15 μm.

When the particles of the negative electrode active material are a mixture of primary particles and secondary particles, the average particle size falls preferably within a range from 3 μm to 10 μm, more preferably within a range from 4 μm to 7 μm.

In addition to the negative electrode active material, the negative electrode active material-containing layer may further contain a conductive agent and/or a binder.

The positive electrode includes a positive electrode current collector and a positive electrode active material-containing layer provided on the positive electrode current collector.

The positive electrode current collector can have, for example, two oppositely facing surfaces. The positive electrode current collector can support the positive electrode active material-containing layer only on one surface thereof or can support the positive electrode active material-containing layer on both surfaces thereof. The positive electrode current collector may include a portion where the positive electrode active material-containing layer is not supported on a surface. This portion may serve as a positive electrode tab, for example. Alternatively, the positive electrode may include a positive electrode tab which is separate from the positive electrode current collector.

The positive electrode active material-containing layer contains a positive electrode active material. In addition to the positive electrode active material, the positive electrode active material-containing layer may further contain a conductive agent and a binder.

In the nonaqueous electrolyte battery according to the first embodiment, the mass C [$g/m^2$] of the positive electrode active material per unit area of the positive electrode and the mass A [$g/m^2$] of the negative electrode active material per unit area of the negative electrode satisfy the formula (1): $0.95 \leq A/C \leq 1.5$. Here, the mass C of the positive electrode active material per unit area of the positive electrode is, specifically, a value obtained by dividing the mass [unit: g] of the positive electrode active material contained in the positive electrode active material-containing layer by the area [unit: $m^2$] of the positive electrode current collector supporting the positive electrode active material-containing layer. When both surfaces of the positive electrode current collector support the positive electrode active material-containing layer, the mass of the positive electrode active material contained in the positive electrode active material-containing layer supported by one surface of the positive electrode current collector is used. Likewise, the mass A of the negative electrode active material per unit area of the negative electrode is, specifically, a value obtained by dividing the mass [unit: g] of the negative electrode active material contained in the negative electrode active material-containing layer by the area [unit: $m^2$] of the negative electrode current collector supporting the negative electrode active material-containing layer. When both surfaces of the negative electrode current collector support the negative electrode active material-containing layer, the mass of the negative electrode active material contained in the negative electrode active material-containing layer supported by one surface of the negative electrode current collector is used.

The mass ratio A/C of the active materials falls preferably within a range from 1 to 1.4 and more preferably within a range from 1.1 to 1.2.

In addition, it is preferable that the positive electrode and the negative electrode satisfy the formula (2):$C_A > C_C$. $C_C$ [mAh/cm$^2$] is an electrode capacity per 1 cm$^2$ of the positive electrode. $C_A$ [mAh/cm$^2$] is an electrode capacity per 1 cm$^2$ of the negative electrode. In the nonaqueous electrolyte battery satisfying the formula (2), it is possible to further reduce the resistance at high SOC, and to suppress deterioration of the negative electrode, and as a result, a life performance is improved.

The positive electrode and the negative electrode can constitute an electrode group. In the electrode group, the positive electrode active material-containing layer and the negative electrode active material-containing layer can face each other with, for example, a separator interposed therebetween. The electrode group can have various structures. For example, the electrode group can have a stack-type structure. An electrode group having the stack-type structure can be obtained by, for example, stacking a plurality of positive electrodes and negative electrodes with a separator provided between the positive electrode active material-containing layer and the negative electrode active material-containing layer. Alternatively, the electrode group can have a wound-type structure. The wound-type electrode group can be obtained by, for example, stacking one separator, one positive electrode, another separator, and one negative electrode in this order to form a stack and winding this stack such that the negative electrode is located outside.

In the nonaqueous electrolyte battery according to the first embodiment, the nonaqueous electrolyte may be held, for example, in a state of being impregnated in the electrode group.

The nonaqueous electrolyte battery according to the first embodiment may further include a negative electrode terminal and a positive electrode terminal. A portion of the negative electrode terminal is electrically connected to a portion of the negative electrode, whereby the negative electrode terminal can serve as a conductor allowing electrons to move between the negative electrode and an external terminal. The negative electrode terminal can be connected to, for example, the negative electrode current collector, particularly the negative electrode tab. Similarly, a portion of the positive electrode terminal is electrically connected to a portion of the positive electrode, whereby the positive electrode terminal can serve as a conductor allowing electrons to move between the positive electrode and an external circuit. The positive electrode terminal can be connected to, for example, the positive electrode current collector, particularly the positive electrode tab.

The nonaqueous electrolyte battery according to the first embodiment may further include a container member. The container member can house the electrode group and the nonaqueous electrolyte. The nonaqueous electrolyte may be impregnated in the electrode group in the container member. A portion of each of the positive electrode terminal and the negative electrode terminal can extend from the container member.

Next, each member that can be included in the nonaqueous electrolyte battery according to the first embodiment will be described in more detail.

(Negative Electrode)

The negative electrode current collector is preferably formed of an aluminum foil or an aluminum alloy foil containing elements such as Mg, Ti, Zn, Mn, Fe, Cu and Si.

The conductive agent that can be included in the negative electrode can enhance the current-collecting performance and can have an effect of suppressing contact resistance between an active material and a current collector. Examples of the conductive agent include carbonaceous materials such as acetylene black, carbon black, graphite, carbon nanofiber, and carbon nanotubes. As the carbonaceous material, one of these materials may be used alone, or a plurality of carbonaceous materials may be used.

The binder can have an effect of binding the active material, the conductive agent and the current collector. Examples of the binder include polytetrafluoroethylene (PTFE), polyvinylidene fluoride (PVdF), fluorine-based rubber, styrene-butadiene rubber, acrylic resin or a copolymer thereof, polyacrylic acid, and polyacrylonitrile.

The blending ratio of the negative electrode active material, the conductive agent, and the binder in the negative electrode active material-containing layer is preferably from 70% by mass to 96% by mass for the negative electrode active material, from 2% by mass to 28% by mass for the negative electrode conductive agent, and from 2% by mass to 28% by mass for the binder. When the content of the conductive agent is less than 2% by mass, the current-collecting performance of the negative electrode active material layer is deteriorated, and large current characteristics of the nonaqueous electrolyte battery may be deteriorated. When the content of the binder is less than 2% by mass, binding properties between the negative electrode active material layer and the negative electrode current collector are reduced, and the cycle characteristics may be deteriorated. On the other hand, from the viewpoint of increasing the capacity, it is preferable that the content of each of the conductive agent and the binder be respectively not more than 28% by mass.

The negative electrode can be produced by the following method, for example. First, a negative electrode active material, a conductive agent and a binder are suspended in a solvent to prepare a slurry. Then, this slurry is applied onto one surface or both surfaces of a negative electrode current collector, and the coating is dried. Subsequently, the dried coating is pressed, whereby a negative electrode active material-containing layer can be obtained.

(Positive Electrode)

The positive electrode current collector is preferably an aluminum foil or an aluminum alloy foil containing one or more elements selected from Mg, Ti, Zn, Mn, Fe, Cu, and Si.

Examples of the positive electrode active material include $Li_uMeO_2$ (Me is at least one selected from Ni, Co, and Mn) having a layered structure. For example, there can be mentioned a lithium nickel composite oxide (e.g., $Li_uNiO_2$), a lithium cobalt composite oxide (e.g., $Li_uCoO_2$), a lithium nickel cobalt composite oxide (e.g., $Li_uNi_{1-s}Co_sO_2$), a lithium manganese cobalt composite oxide (e.g., $Li_uMn_sCo_{1-s}O_2$), a lithium nickel cobalt manganese composite oxide (e.g., $Li_uNi_{1-s-t}Co_sMn_tO_2$), a lithium nickel cobalt aluminum composite oxide (e.g., $Li_uNi_{1-s-t}Co_sAl_tO_2$), a lithium manganese composite oxide having a spinel structure (e.g., $Li_uMn_2O_4$ and $Li_uMn_{2-s}Al_sO_4$), and a lithium phosphorus oxide having an olivine structure (e.g., $Li_uFePO_4$, $Li_uMnPO_4$, $Li_uMn_{1-s}Fe_sPO_4$, and $Li_uCOPO_4$). In the above examples, it is preferable that 0<u≤1, 0≤s≤1, and 0≤t≤1. As the active material, a spinel-type lithium manganese composite oxide such as $Li_uMn_2O_4$ or $Li_uMn_{2-s}Al_sO_4$ may be used alone, or a plurality of compounds may be used in combination.

In order to easily obtain high input-and-output characteristics and an excellent life performance, among the above materials, the positive electrode preferably contains a lithium manganese composite oxide having a spinel-type structure ($Li_uMn_2O_4$ or $Li_uMn_{2-s}Al_sO_4$), a lithium cobalt composite oxide ($Li_uCoO_2$), a lithium nickel cobalt composite oxide ($Li_uNi_{1-s}Co_sO_2$), a lithium manganese cobalt composite oxide ($Li_uMn_sCo_{1-s}O_2$), a lithium nickel cobalt manganese composite oxide (e.g., $Li_uNi_{1-s-t}Co_sMn_tO_2$), or a lithium phosphorus oxide having an olivine structure (e.g., $Li_uFePO_4$, $Li_uMnPO_4$, $Li_uMn_{1-s}Fe_sPO_4$, and $Li_uCoPO_4$). In the above examples, it is preferable that 0<u≤1, 0≤s≤1, and 0≤t≤1.

The conductive agent that can be included in the positive electrode can enhance the current-collecting performance and can have the effect of suppressing contact resistance between an active material and a current collector. Examples of the conductive agent include carbonaceous materials such as acetylene black, carbon black, graphite, carbon nanofiber, and carbon nanotubes. As the carbonaceous material, one of these materials may be used alone, or a plurality of carbonaceous materials may be used.

The binder can have an effect of binding the active material, the conductive agent and the current collector. Examples of the binder include polytetrafluoroethylene (PTFE), polyvinylidene fluoride (PVdF), fluorine-based rubber, styrene-butadiene rubber, acrylic resin or a copolymer thereof, polyacrylic acid, and polyacrylonitrile.

The total of the positive electrode active material and the contents of the binder and the conductive agent, in the positive electrode active material-containing layer, are preferably from 80% by mass to 95% by mass, from 3% by mass to 18% by mass, and from 2% by mass to 17% by mass, respectively. When the content of the conductive agent is not less than 3% by mass, the above-described effect can be exhibited. When the content of the conductive agent is not more than 18% by mass, decomposition of the nonaqueous electrolyte on the surface of the conductive agent under high temperature storage can be reduced. When the content of the binder is not less than 2% by mass, sufficient electrode strength can be obtained. When the content of the binder is not more than 17% by mass, the blending amount of the binder which is an insulating material in the positive electrode can be decreased, and the internal resistance can be reduced.

The positive electrode can be produced by the following method, for example. First, a positive electrode active material, a conductive agent and a binder are suspended in a solvent to prepare a slurry. This slurry is applied onto one surface or both surfaces of a positive electrode current collector, and the coating is dried. Subsequently, the dried coating is pressed, whereby a positive electrode active material-containing layer can be obtained.

(Nonaqueous Electrolyte)

As the nonaqueous electrolyte, a liquid nonaqueous electrolyte or gel-like nonaqueous electrolyte can be used, for example.

The liquid nonaqueous electrolyte can be prepared by dissolving an electrolyte in an organic solvent. The concentration of the electrolyte is preferably in the range of 0.5 to 2.5 mol/l. The gel nonaqueous electrolyte is prepared by combining a liquid electrolyte and a polymer material.

Examples of the electrolyte include lithium salt such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and bistrifluoromethylsulfonylimide lithium [$LiN(CF_3SO_2)_2$]. As the electrolyte, one of these electrolytes may be used alone, or two or more electrolytes may be used in combination. The electrolyte preferably contains $LiPF_6$.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); acetonitrile (AN); and sulfolane (SL). As the organic solvent, one of these solvents may be used alone, or two or more solvents may be used in combination.

More preferred examples of the organic solvent include a mixed solvent obtained by mixing two or more solvents selected from the group consisting of propylene carbonate (PC), ethylene carbonate (EC), diethyl carbonate (DEC), dimethyl carbonate (DMC), and methylethyl carbonate (MEC). By using such a mixed solvent, a nonaqueous electrolyte battery excellent in charge-and-discharge cycle characteristics can be obtained. Additives can also be added to an electrolyte solution.

(Separator)

As the separator, porous films formed of materials such as polyethylene, polypropylene, polyethylene terephthalate, cellulose, and polyvinylidene fluoride (PVdF) or unwoven fabrics formed of synthetic resins can be used, for example. In addition, a separator in which an inorganic compound is applied to a porous film can be used.

(Container Member)

As a container member, a bag-shaped container made of a laminate film or a metallic container may be used, for example.

Although the shape is not particularly limited, examples thereof include flat type, square type, cylindrical type, coin type, button type, sheet type, and laminate type. It is needless to say that in addition to a small battery mounted on mobile electronic devices, the nonaqueous electrolyte battery may also be a large battery mounted on two-wheeled to four-wheeled automobiles.

As the laminate film, for example, a multilayer film in which a metal layer is sandwiched between resin films can be used. Alternatively, a multilayer film consisting of a metal layer and resin layers covering the metal layer can be also used.

The metal layer is preferably an aluminum foil or an aluminum alloy foil to reduce the weight thereof. The resin film may be formed using, for example, a polymeric material such as polypropylene (PP), polyethylene (PE), nylone, or polyethylene terephthalate (PET). The laminate film can be heat-sealed to form into the shape of the container member. The laminate film preferably has a thickness of not more than 0.2 mm.

The metallic container may be formed of aluminum or aluminum alloy. The aluminum alloy preferably contains elements such as magnesium, zinc, and silicon. On the other hand, it is preferable that the content of the transition metals such as iron, copper, nickel, and chromium is not more than 100 ppm. According to this constitution, long-term reliability and heat dissipation under high temperature environment can be dramatically enhanced. The wall thickness of the metallic container is preferably 0.5 mm or less and particularly preferably 0.2 mm or less.

(Positive Electrode Terminal)

The positive electrode terminal is formed of a material which is electrically stable in the range where the potential with respect to an oxidation-and-reduction potential of lithium is from 3.0 V to 4.5 V, for example, and has conductivity. The positive electrode terminal is preferably formed from aluminum or an aluminum alloy including an element such as Mg, Ti, Zn, Mn, Fe, Cu, and Si. The positive electrode terminal is preferably formed of the same material as that of the positive electrode current collector in order to reduce the contact resistance with the positive electrode current collector.

(Negative Electrode Terminal)

The negative electrode terminal is formed of a material which is electrically stable in the range where the potential with respect to an oxidation-and-reduction potential of lithium is from 0.8 V to 3.0 V and has conductivity. The negative electrode terminal is preferably formed from aluminum or an aluminum alloy including an element such as Mg, Ti, Zn, Mn, Fe, Cu, and Si. The negative electrode terminal is preferably formed of the same material as that of the negative electrode current collector in order to reduce the contact resistance with the negative electrode current collector.

Next, nonaqueous electrolyte batteries of some examples according to the first embodiment will be specifically described with reference to the drawings.

Figure 3:
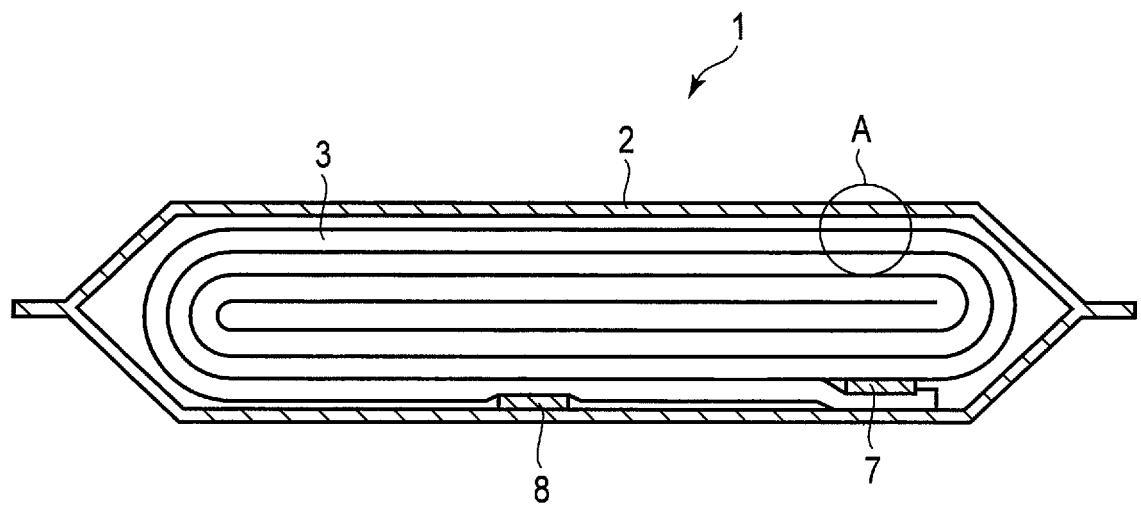
FIG. 3 is a schematic cross-sectional view of an example of a flat-type nonaqueous electrolyte battery according to the first embodiment.
Figure 4:
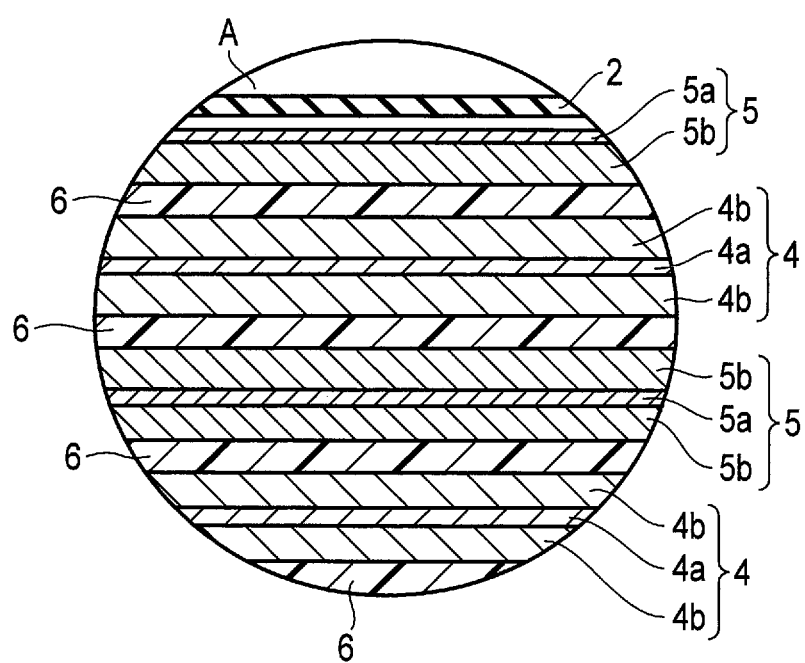
FIG. 4 is an enlarged cross-sectional view of an A portion of FIG. 3.

FIG. 3 is a schematic cross-sectional view of an example of a flat-type nonaqueous electrolyte battery according to the first embodiment. FIG. 4 is an enlarged cross-sectional view of an A portion of FIG. 3.

A nonaqueous electrolyte battery 1 shown in FIGS. 3 and 4 includes a wound-type electrode group 3 in a flat form shown in FIG. 3. The wound electrode group 3 in a flat form is housed in a bag-shaped container member 2 made from a laminate film including a metal layer and two resin films sandwiching the metal layer therebetween.

The wound electrode group 3 in a flat form is formed by spirally winding a stack which includes, from the outside to the inside, a negative electrode 5, a separator 6, a positive electrode 4, and a separator 6, as shown in FIG. 4, and then press-forming the wound stack. At a portion of the negative electrode 5 located on the outermost side, a negative electrode active material-containing layer 5b containing a negative electrode active material is provided on one surface on the internal surface side of a negative electrode current collector 5a as shown in FIG. 4. In the other portion of the negative electrode 5, the negative electrode active material-containing layers 5b are provided on both surfaces of the negative electrode current collector 5a. For the positive electrode 4, positive electrode active material-containing layers 4b are provided on both surfaces of a positive electrode current collector 4a.

In the vicinity of the outer peripheral edge of the wound-type electrode group 3, a negative electrode terminal 8 is connected to the negative electrode current collector 5a at an outermost layer portion of the negative electrode 5, and a positive electrode terminal 7 is connected to the positive electrode current collector 4a of the positive electrode 4 located inside. The negative electrode terminal 8 and the positive electrode terminal 7 are extended outside from an opening of the bag-shaped container member 2.

The nonaqueous electrolyte battery 1 shown in FIGS. 3 and 4 further includes a nonaqueous electrolyte (not shown).

The nonaqueous electrolyte is housed in the container member 2 in a state of being impregnated in the electrode group 3.

The nonaqueous electrolyte can be injected via, for example, the opening of the bag-shaped container member 2. After the injection of the nonaqueous electrolyte, the wound-type electrode group 1 and the nonaqueous electrolyte can be completely sealed by heat-sealing the opening of the bag-shaped container member 2 with the negative electrode terminal 8 and the positive electrode terminal 7 interposed therebetween.

Figure 5:
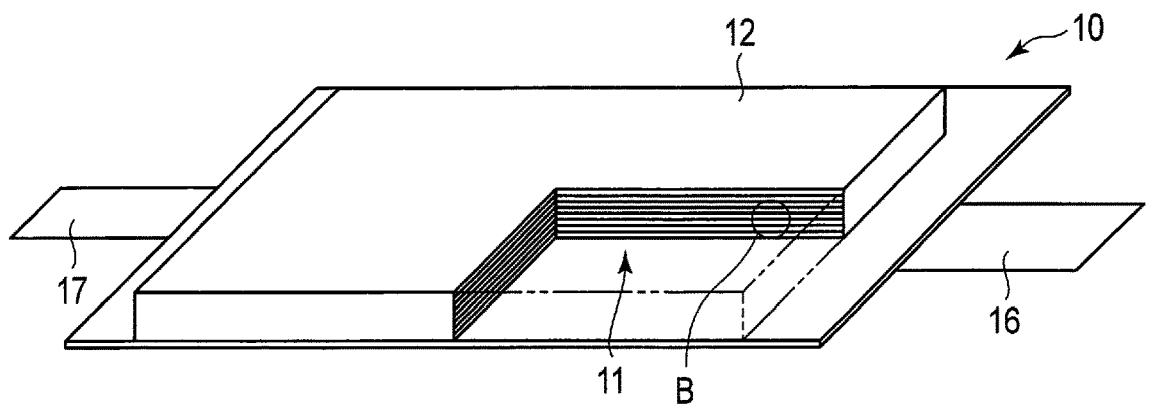
FIG. 5 is a schematic partially cut-away perspective view of another example of a nonaqueous electrolyte battery according to the first embodiment.
Figure 6:
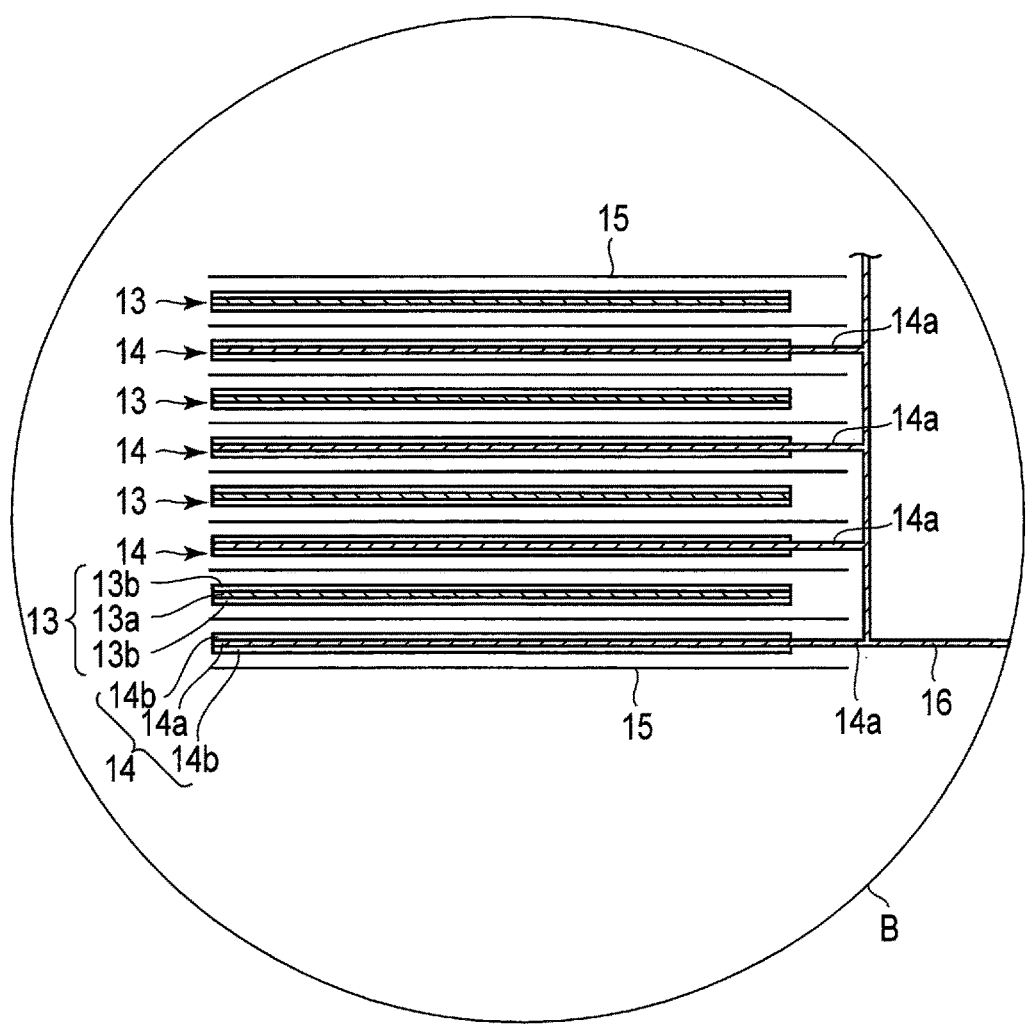
FIG. 6 is an enlarged cross-sectional view of a B portion of FIG. 5.

The nonaqueous electrolyte battery according to the first embodiment is not limited to the above-described structure shown in FIG. 3 and FIG. 4, and may have the structure shown in FIG. 5 and FIG. 6.

FIG. 5 is a schematic partially cut-away perspective view of another example of a nonaqueous electrolyte battery according to the first embodiment. FIG. 6 is an enlarged cross-sectional view of a B portion of FIG. 5.

A nonaqueous electrolyte battery 10 shown in FIGS. 5 and 6 includes a stack-type electrode group 11. The stack-type electrode group 11 is housed in the container member 12 made of a laminate film including a metal layer and two resin films sandwiching the metal layer therebetween.

The stack-type electrode group 11 has a structure in which a positive electrode 13 and a negative electrode 14 are alternately stacked with a separator 15 being sandwiched therebetween as shown in FIG. 6. There are a plurality of the positive electrodes 13, each of which includes a current collector 13a and a positive electrode active material-containing layer 13b which is supported on each of both surfaces of the current collector 13a. There are a plurality of the negative electrodes 14, each of which includes a current collector 14a and a negative electrode active material-containing layer 14b which is supported on each of both surfaces of the current collector 14a. One side of the current collector 14a of each of the negative electrodes 14 is projected from the positive electrodes 13. A portion of the current collector 14a projected from the positive electrode 13 is electrically connected to a belt-like negative electrode terminal 16. A leading end of the belt-like negative electrode terminal 16 is drawn to the outside from the container member 12. Further, although not shown, as for the current collector 13a of the positive electrode 13, a side positioned at an opposite side of the projected side of the current collector 14a is projected from the negative electrodes 14. A portion of the current collector 13a projected from the negative electrode 14 is electrically connected to a belt-like positive electrode terminal 17. A leading end of the belt-like positive electrode terminal 17 is positioned at an opposite side of the negative electrode terminal 16 and is drawn to the outside from a side of the container member 12.

(Measurement Method)

Various measurement methods will be described below.

(Identification Method of Mass Ratio A/C)

First, a nonaqueous electrolyte battery to be measured is provided. Although the state of charge is not particularly limited, from the safety standpoint, it is preferable to put the battery into a discharged state.

The provided nonaqueous electrolyte battery is disassembled in a glove box filled with argon gas or $N_2$ gas. The positive electrode and the negative electrode are taken out of the disassembled battery. The taken-out positive electrode and negative electrode are washed with an ethylmethyl carbonate solvent. The electrolyte remaining on the positive electrode and the negative electrode can be removed by the washing. Then, the positive electrode and the negative electrode are dried, and the ethylmethyl carbonate solvent is removed.

Then, a method of obtaining the mass of the positive electrode active material contained in the positive electrode active material-containing layer will be described. The positive electrode is cut to a certain size. For example, a 5 cm×5 cm square is cut out, and the mass is measured. After the measurement, the positive electrode active material-containing layer is peeled off, and the mass of a current collector foil is measured. At this time, the peeled-off positive electrode active material-containing layer is stored. When the positive electrode active material-containing layer is supported on both surfaces of the current collector foil, only the positive electrode active material-containing layer supported on one surface is stored. The mass per unit area of the positive electrode active material-containing layer is obtained from the total mass and the mass of the current collector foil.

The peeled-off positive electrode active material-containing layer is subjected to thermogravimetric analysis (TG) in the atmosphere. In this analysis, weight change reduced due to heating to 600° C. is identified. The weight content reduced due to heating to 600° C. is the weight of the conductive agent and the binder contained in the positive electrode active material-containing layer. The mass of the positive electrode active material contained in the positive electrode active material-containing layer can be obtained by subtracting the weight reduced due to heating from the weight before heating.

The mass ratio of the positive electrode active material contained in the positive electrode active material-containing layer is known from the calculated mass of the positive electrode active material, and the mass C [g/m$^2$] of the positive electrode active material per unit area of the positive electrode can be obtained from a previously measured mass of the positive electrode active material-containing layer per unit area. The mass A [g/m$^2$] of the negative electrode active material per unit area of the negative electrode can also be measured in the same manner.

The mass ratio A/C can be obtained by dividing the measured mass A by the mass C.

(Method of Measuring Electrode Capacity)

An electrode capacity per 1 cm$^2$ of each of the positive electrode and the negative electrode is measured by the following procedure.

First, the nonaqueous electrolyte battery to be measured is disassembled in a glove box filled with argon gas or N$_2$ gas, and the positive electrode and the negative electrode are taken out of the disassembled nonaqueous electrolyte battery. Then, the taken-out positive electrode and negative electrode are washed with an ethylmethyl carbonate solvent. The electrolyte remaining on the positive electrode and the negative electrode is removed by the washing. Then, the washed positive and negative electrodes are dried, and the ethylmethyl carbonate solvent is removed.

Then, a first three-electrode cell is fabricated using the positive electrode as a working electrode and using Li metal as a counter electrode and a reference electrode. As the nonaqueous electrolyte, for example, it is possible to use a nonaqueous electrolyte obtained by dissolving LiPF$_6$ at a concentration of 1.0 M in a mixed solvent prepared by mixing ethylene carbonate and diethyl carbonate in the volume ratio 1:1. Likewise, a second three-electrode cell is fabricated using the negative electrode as a working electrode and using Li metal as a counter electrode and a reference electrode. As the nonaqueous electrolyte, for example, it is possible to use a nonaqueous electrolyte obtained by dissolving LiPF$_6$ at a concentration of 1.0 M in a mixed solvent prepared by mixing ethylene carbonate and diethyl carbonate in the volume ratio 1:1.

The first three-electrode cell is charged to 4.3 V (vs. Li/Li$^+$) at a constant current with a current density of 0.1 mA/cm$^2$ at 25° C. Subsequently, the first three-electrode cell is charged at a constant voltage of 4.3 V. It is determined that the charging is completed once the current density reaches 0.02 mA/cm$^2$. Thereafter, the first three-electrode cell is left in that state for 10 minutes. Subsequently, the first three-electrode cell is discharged to 3.5 V (vs. Li/Li$^+$) at a constant current with a current density of 0.1 mA/cm$^2$. The discharge amount obtained by the discharging is divided by the area of the positive electrode to obtain the electrode capacity $C_C$ [mAh/cm$^2$] per 1 cm$^2$ of the positive electrode.

On the other hand, the second three-electrode cell is charged to 1 V (vs. Li/Li$^+$) at a constant current with a current density of 0.1 mA/cm$^2$ at 25° C. Subsequently, the second three-electrode cell is charged at a constant voltage of 1.1 V. It is determined that the charging is completed once the current density reaches 0.02 mA/cm$^2$. Thereafter, the second three-electrode cell is left in that state for 10 minutes. Subsequently, the second three-electrode cell is discharged to 2.5 V (vs. Li/Li$^+$) at a constant current with a current density of 0.1 mA/cm$^2$. The discharge amount obtained by the discharging is divided by the area of the negative electrode to obtain the electrode capacity $C_A$ per 1 cm$^2$ of the negative electrode.

(Identification Method of Negative Electrode Active Material)

With respect to the negative electrode active material incorporated in the nonaqueous electrolyte battery, the composition and the crystal structure can be confirmed by the following procedure.

First, in order to analyze the crystal state of the active material, the active material is put into a state in which lithium ions are released from the active material to be measured. The orthorhombic Na-containing niobium titanium composite oxide contains in the structure lithium that is not involved in charge and discharge. Thus, the phrase "state in which lithium ions are released" referred to here means a state in which lithium involved in charge and discharge is released. For example, when the active material to be measured is contained in the negative electrode, the battery is put into a fully discharged state. However, even in a state in which the battery is discharged, lithium ions may remain in the active material. Thus, much care is necessary to analyze an X-ray diffraction pattern.

Next, the battery in such a state is disassembled in a glove box filled with argon. An electrode containing an active material to be measured is taken out of the disintegrated battery. This electrode is washed with an appropriate solvent. For example, ethylmethyl carbonate or the like may be used. If the washing is insufficient, impurity phases such as lithium carbonate and lithium fluoride may be mixed due to the influence of lithium ions remaining in the electrode. In such a case, it is better to use an airtight container in which the measurement can be performed in an inert gas atmosphere.

The cross-section of the electrode taken out as described above is cut with an ion milling device. The cross-section of the cut electrode is observed with a scanning electron microscope (SEM). Sampling of a sample is performed under an inert atmosphere, such as argon and nitrogen, while being prevented from being exposed to the air.

Some particles are selected using an SEM observation image at a magnification of 3000. At that time, the particles are selected so that the particle size distribution of the selected particles is as broad as possible.

Then, for each selected particle, elemental analysis is performed by energy dispersive X-ray spectroscopy (EDX). Consequently, it is possible to specify the kind and amount of elements other than Li among the elements contained in each selected particle.

The crystal structure of the compound contained in each particle selected by SEM can be specified by X-ray diffraction (XRD) measurement.

The measurement is carried out in the measurement range of 2θ=10 to 90°. With a CuKα ray as a radiation source. This measurement can obtain an X-ray diffraction pattern of the compound contained in the selected particle.

As the powder X-ray diffraction measurement apparatus, SmartLab, manufactured by Rigaku Corporation, is used. The measurement conditions are: Cu target; 45 kV 200 mA; Solar Slit: 5° in both incident light and reception light; step width: 0.02 degrees; scan speed: 20 degrees/minute; semiconductor detector: D/teX Ultra 250; sample plate holder: flat glass sample plate holder (thickness: 0.5 mm); measurement range: a range of 10°≤2θ≤90°. When another apparatus is used, in order to obtain measurement results equivalent to those described above, measurement using a standard Si powder for powder X-ray diffraction is performed, and then measurement is performed under conditions where a peak intensity and a peak top position correspond to those by obtained using the above apparatus.

When the orthorhombic Na-containing niobium titanium composite oxide is included in the particle to be measured, it can be identified that an X-ray diffraction pattern assigned to the orthorhombic system such as the space group of Cmca or Fmmm can be obtained by the X-ray diffraction measurement.

The XRD measurement of the electrode can be performed by cutting the electrode to be measured into a size having the same area of the holder of the wide-angle X-ray diffractometer and directly attaching the cut electrode to the glass holder, and measuring it. At this time, XRD is measured in advance with regard to the kind of the metal foil of the electrode current collector to grasp a position where a peak originating from the current collector appears. Furthermore, it is necessary to grasp in advance whether or not there are peaks originated from the ingredients such as a conductive agent and binder. When the peak of the current collector is overlapped on the peak of the active material, it is desired to separate the active material from the current collector prior to the measurement. This is in order to separate the overlapping peaks when quantitatively measuring the peak intensity. Of course, the procedure may be omitted if these data have been found in advance. The electrode may be separated physically. It is easily separated by applying ultrasonic waves in a solvent. The electrode recovered in this manner is measured, so that the active material can be subjected to wide-angle X-ray diffraction.

The composition of the whole active material included in the electrode can be measured by the following procedure.

First, according to the procedure described above, an electrode containing the active material to be measured is taken out from a nonaqueous electrolyte battery and washed.

Using a portion of the washed electrode, the composition of particles included in the electrode is identified by the method described above.

On the other hand, another portion of the washed electrode is put into an appropriate solvent to apply an ultrasonic wave thereto. For example, an electrode body is put into ethylmethyl carbonate in a glass beaker and vibrated in an ultrasonic washer, whereby the electrode layer containing the electrode active material can be peeled off from a current collector substrate. Then, the peeled electrode layer is dried in a reduced pressure. The obtained electrode layer is ground in a mortar or the like to obtain a powder including the active material to be measured, a conductive agent, a binder and the like. The resulting powder is dissolved in an acid to produce a liquid sample containing the active material. At this time, hydrochloric acid, nitric acid, sulfuric acid or hydrogen fluoride may be used as the acid. The liquid sample is subjected to ICP emission spectral analysis, whereby the concentrations of elements included in the active material included in the electrode can be found.

By using combination of the identification of the composition by SEM and EDX, the identification of the crystal structure by XRD, and results of ICP emission spectrochemical analysis for the particles included in the electrode, the composition and the crystal structure of the compound contained in the particles can be identified.

(Method of Measuring Particle Size)

In the SEM observation described previously of the active material, an image of a powder of the active material is obtained in the magnification of 3000 times. In the obtained field of view, a group of particles where the fact that the primary particles are in contact with each other can be confirmed is defined as secondary particles.

The primary particle size is obtained from a diameter of a smallest circle corresponding to the primary particle. Specifically, the particle size is measured 10 times based on an SEM image of the magnification of 3000 times, and the average value of the diameters of the minimum circle obtained in each time is defined as the primary particle size. For the calculation of the average value, the maximum value and the minimum value of the particle size of measurements of 10 times are not used.

A secondary particle size is measured by a method similar to that of primary particles. That is, the diameter of the minimum circle corresponding to the secondary particle is obtained. Specifically, the particle size is measured 10 times based on an SEM image of the magnification of 3000 times, and the average value of the diameters of the minimum circle obtained in each time is defined as the secondary particle size. For the calculation of the average value, the maximum value and the minimum value of the particle size of measurements of 10 times are not used.

According to a first embodiment, a nonaqueous electrolyte battery is provided. The nonaqueous electrolyte battery includes a negative electrode containing a negative electrode active material containing an orthorhombic Na-containing niobium titanium composite oxide, a positive electrode containing a positive electrode active material, and a nonaqueous electrolyte. The mass ratio A/C of the active materials satisfies the formula (1): 0.95≤A/C≤1.5. Even when the nonaqueous electrolyte battery according to the first embodiment enters a high state-of-charge, the negative electrode can be prevented from entering a high resistance state. In addition, the nonaqueous electrolyte battery according to the first embodiment can exhibit high energy density. Thus, the nonaqueous electrolyte battery according to the first embodiment can exhibit both excellent input-and-output characteristics and high energy density.

Second Embodiment

According to the second embodiment, a battery pack is provided. The battery pack includes the nonaqueous electrolyte battery according to the first embodiment.

The battery pack according to the second embodiment may include a plurality of nonaqueous electrolyte batteries. The plurality of nonaqueous electrolyte batteries can be electrically connected in series or parallel. Alternatively, a plurality of nonaqueous electrolyte batteries may also be connected in a combination of a series connection and a parallel connection.

For example, the battery pack according to the second embodiment may include five nonaqueous electrolyte batteries according to the first embodiment. These nonaqueous electrolyte batteries can be connected in series. The nonaqueous electrolyte batteries connected in series can constitute a battery module. That is, the battery pack according to the second embodiment can also include the battery module.

The battery pack according to the second embodiment can include a plurality of battery modules. A plurality of battery modules may be connected in series, in parallel, or in a combination of a series connection and a parallel connection.

The battery pack according to the second embodiment will be described in detail with reference to FIGS. 7 and 8. As the single battery, the flat battery shown in FIGS. 3 and 4 can be used.

A plurality of single batteries 21 each of which is the flat-type nonaqueous electrolyte battery shown in FIGS. 3 and 4 described above are stacked such that a negative electrode terminal 8 and a positive electrode terminal 7 extending outward are arranged in the same direction, and they are fastened with an adhesive tape 22 to form a battery module 23. Those single batteries 21 are electrically connected to each other in series as shown in FIG. 8.

A printed wiring board 24 is disposed facing side surfaces of the single batteries 21 from which the negative electrode terminal 8 and the positive electrode terminal 7 extend. As shown in FIG. 8, a thermistor 25, a protective circuit 26, and a power distribution terminal 27 for passing current to external devices are mounted on the printed wiring board 24. An insulating plate (not shown) is attached to a surface of the printed wiring substrate 24 facing the battery module 23, in order to avoid unnecessary connect with wires of the battery module 23.

A positive electrode lead 28 is connected to the positive electrode terminal 7 positioned in the bottom layer of the battery module 23, and its tip is inserted into a positive electrode connector 29 of the printed wiring board 24 for electrical connection. A negative electrode lead 30 is connected to the negative electrode terminal 8 positioned in the top layer of the battery module 23, and its tip is inserted into a negative electrode connector 31 of the printed wiring board 24 for electrical connection. These connectors 23 and 31 are connected to the protective circuit 26 through wires 32 and 33 formed on the printed wiring board 24.

The thermistor 25 detects a temperature of the single batteries 21, and the detection signal thereof is transmitted to the protective circuit 26. The protective circuit 26 can interrupt a plus wire $34a$ and a minus wire $34b$ between the protective circuit 26 and the power distribution terminal 27 for distributing power to external devices at a predetermined condition. The predetermined condition may include, for example, a condition in which the detection temperature of the thermistor 25 is more than a predetermined temperature. Also, the predetermined condition may include a condition in which over-charge, over-discharge, and overcurrent of the single battery 21 are detected. Each of the single batteries 21 or the entire battery module 23 are subjected to the detection of the over-charge and the like. When each of the single batteries 21 is detected, a battery voltage may be detected, or a positive electrode potential or a negative electrode potential may be detected. In the latter case, a lithium electrode used as a reference electrode is inserted into each of the single batteries 21. In the cases of FIGS. 7 and 8, wires 35 are connected to each of the single batteries 21 for voltage detection, and detection signals are transmitted to the protective circuit 26 through these wires 35.

A rubber or resin protective sheet 36 is disposed on each of three side surfaces of the battery module 23 except for the side surface from which the positive electrode terminal 7 and the negative electrode terminal 8 are projected.

The battery module 23 is housed in a housing container 37 together with the protective sheets 36 and the printed wiring board 24. In other words, the protective sheets 36 are arranged on both of inner surfaces in a long-side direction of the housing container 37 and one inner surface in a short-side direction of the housing container 37, and the printed wiring board 24 is disposed on the other inner surface in a short side direction. The battery module 23 is positioned in a space surrounded by the protective sheets 36 and the printed wiring board 24. A lid 38 is attached to a top face of the housing container 37.

For fixing the battery module 23, a thermally-shrinkable tape may be used instead of the adhesive tape 22. In that case, after protective sheets are arranged at both of side faces of the battery module, it is surrounded by a thermally-shrinkable tape, and then the thermally-shrinkable tape is thermally shrunk to bind the battery module.

Figure 7:
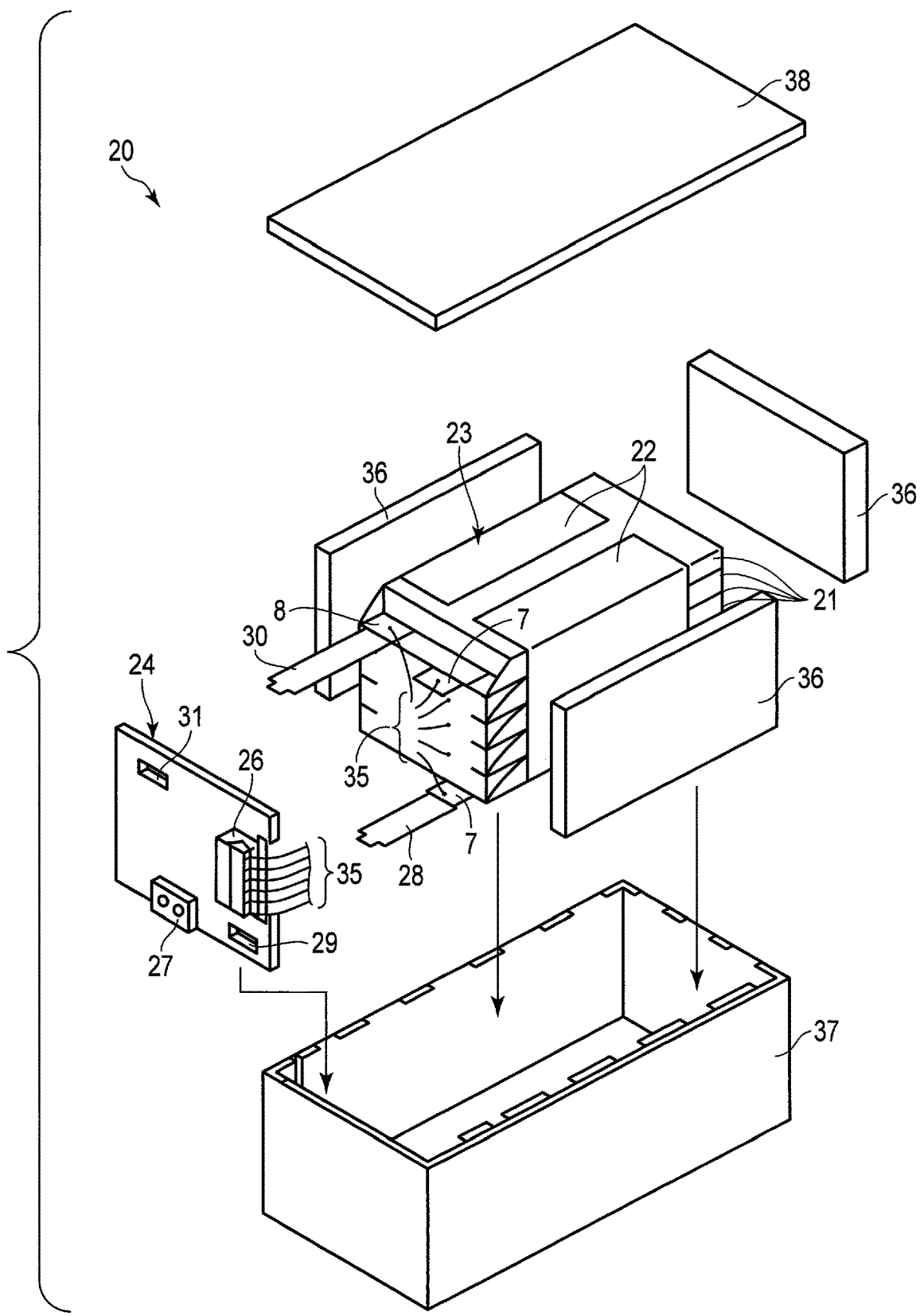
FIG. 7 is a schematic exploded perspective view of an example of a battery pack according to a second embodiment.

In FIGS. 7 and 8, although an embodiment in which the single batteries 21 are connected in series is described, they may be connected in parallel, for increasing a battery capacity. The assembled battery packs may be connected in series and/or in parallel.

The battery pack according to the second embodiment may include the nonaqueous electrolyte batteries of various forms according to the first embodiment.

Figure 9:
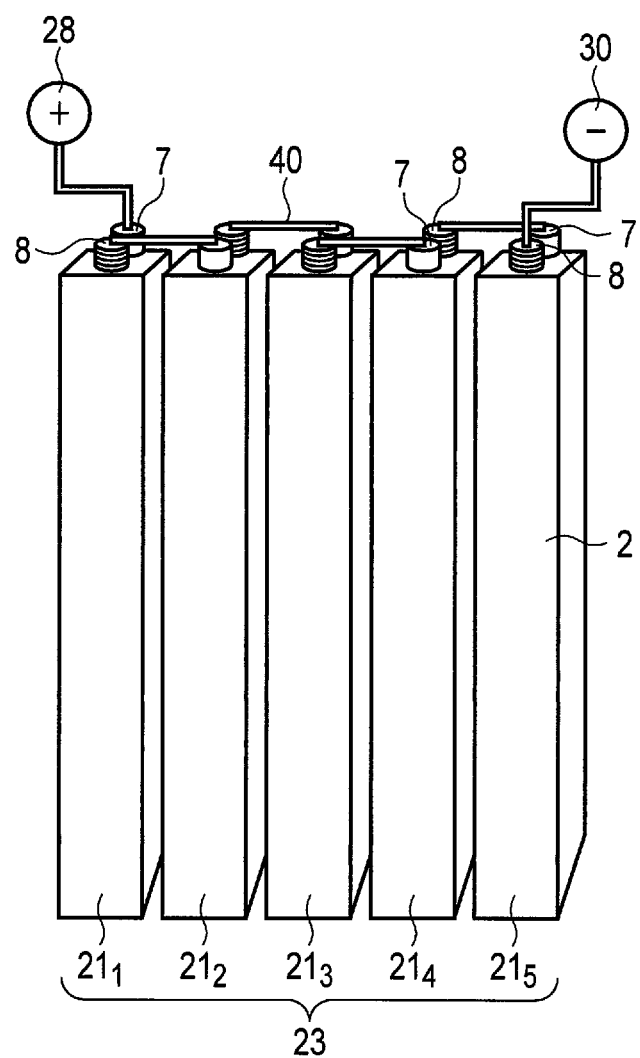
FIG. 9 is a schematic perspective view of an example of a battery module which can be included in the battery pack according to the second embodiment.

FIG. 9 is a schematic perspective view of an example of a battery module which can be included in the battery pack according to the second embodiment.

The battery module 23 shown in FIG. 9 includes five single batteries $21_1$ to $21_5$. Each of the batteries $21_1$ to $21_5$ is an example of a nonaqueous electrolyte battery according to the first embodiment. Each of the batteries $21_1$ to $21_5$ is provided with a metallic square container member 2. The container member 2 accomodates an electrode group similar to the electrode group 3 shown in FIG. 3 and a nonaqueous electrolyte impregnated in the electrode group.

The positive electrode terminal 7 of the battery $21_1$ shown at the left end is connected to the positive electrode lead 28 for external connection. The negative electrode terminal 8 of the battery $21_1$ is connected to the positive electrode terminal 7 of the battery $21_2$, adjacent to the right side of the battery $21_1$, via a lead 40. The negative electrode terminal 8 of the battery $21_2$, is connected to the positive electrode terminal 7 of the battery $21_3$, adjacent to the right side of the battery $21_2$, via a lead 40. The negative electrode terminal 8 of the single battery $21_3$ is connected to the positive electrode terminal 7 of the single battery $21_4$, adjacent to the right side of the single battery $21_3$, via a lead 40. The negative electrode terminal 8 of the single battery $21_4$ is connected to the positive electrode terminal 7 of the battery $21_5$, adjacent to the right side of the battery $21_4$, via a lead 40. The negative electrode terminal 8 of the battery $21_5$ shown at the right end is connected to the negative electrode lead 30 for external connection. Through such a connection, the five batteries $21_1$ to $21_5$ are electrically connected in series.

A battery module configured by connecting the five nonaqueous electrolyte batteries each according to the first embodiment in series can exhibit an average operating voltage of 12 V to 14 V. The average operating voltage within this range is about the same as the average operating voltage of a 12 V-type battery module including a lead-acid storage battery. Accordingly, a battery module capable of exhibiting such an average operating voltage can assist the input and output of a lead-acid storage battery when connected in parallel with the 12 V-type battery module including the lead-acid storage battery. As a result, it is possible to prevent over-discharge and charge due to excessive current, which cause deterioration of the lead-acid storage battery. Thus, the battery module configured by connecting the five nonaqueous electrolyte batteries each according to the first embodiment to each other in series can exhibit excellent voltage-compatibility with a battery module including a lead-acid storage battery.

The embodiments of the battery pack according to the second embodiment may be appropriately altered depending on the application thereof. The battery pack according to the second embodiment is suitably used in application requiring excellent cycle characteristics when a large current is taken. More specifically, the battery pack is used as a power source for digital cameras or as a battery to be mounted on a vehicle-mounted, for example, trains, two- or four-wheel hybrid electric vehicles, two- or four-wheel electric vehicles, motor-assisted bicycles, and the like. In particular, the battery pack is suitably used as a battery to be mounted on vehicle.

Since the battery pack according to the second embodiment includes the nonaqueous electrolyte battery according to the first embodiment, the battery pack can exhibit both excellent input-and-output characteristics and high energy density.

EXAMPLES

Examples will be explained below, but the present invention is not limited to Examples described below without departing from the scope of the invention.

Example 1

In Example 1, a nonaqueous electrolyte battery of Example 1 was manufactured by the following procedure.
[Production of Positive Electrode]
First, a powder of spinel-type lithium manganese composite oxide $LiAl_{0.1}Mn_{1.9}O_4$ was provided as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass: 5% by mass: 5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 95 g/m². Then, the coating was dried and pressed. Thus, a positive electrode having an electrode density (excluding current collector) of 2.7 g/cm³ was produced.
[Production of Negative Electrode]
First, a powder of orthorhombic Na-containing niobium titanium composite oxide $Li_2Na_{1.7}Ti_{5.7}Nb_{0.3}O_{14}$ was provided by the following procedure.

As raw materials, titanium oxide $TiO_2$, lithium carbonate $Li_2CO_3$, sodium carbonate $Na_2CO_3$, and niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground. The mixed raw materials were subjected to heat treatment at 900° C. for 3 hours in the atmosphere. Thus, a powder of a product was obtained.

Then, the powder of $Li_2Na_{1.7}Ti_{5.7}Nb_{0.3}O_{14}$, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced. [Production of Electrode Group]

Next, two separators made of a porous film made of polyethylene whose thickness was 25 μm were provided.

Then, the positive electrode produced as above, one separator, the negative electrode produced as above, and the other separator were stacked in this order to obtain a stack. The stack was spirally wound. This was heat-pressed at 90° C. to produce a flat electrode group having a width of 30 mm and a thickness of 3.0 mm.

The obtained electrode group was accomodated in a pack formed of a laminate film, and vacuum dried at 80° C. for 24 hours. The laminate film is constituted by forming polypropylene layers on both surfaces of an aluminum foil having a thickness of 40 μm, and the total film thickness thereof was 0.1 mm. [Preparation of Liquid Nonaqueous Electrolyte]

Propylene carbonate (PC) and diethyl carbonate (DEC) were mixed at a volume ratio of 1:1 to obtain a mixed solvent. $LiPF_6$ as an electrolyte was dissolved at a concentration of 1M in the mixed solvent to prepare a liquid nonaqueous electrolyte.

[Manufacturing of Nonaqueous Electrolyte Secondary Battery]

The liquid nonaqueous electrolyte was poured into the laminate-film pack accomodating the electrode group as described above. Then, the pack was completely sealed by heat sealing. Thus, a nonaqueous electrolyte battery having the structure shown in FIGS. 3 and 4 described above, a width of 35 mm, a thickness of 3.2 mm, and a height of 65 mm was manufactured. The capacity of this nonaqueous electrolyte battery was 300 mAh.

Example 2

In Example 2, a nonaqueous electrolyte battery of Example 2 was produced in the same procedure as in Example 1 except that the coating amount of the slurry was 105 g/m² per unit area of the positive electrode in the production of the positive electrode.

Example 3

In Example 3, a nonaqueous electrolyte battery of Example 3 was produced in the same procedure as in Example 1 except that the coating amount of the slurry was 77 g/m² per unit area of the positive electrode in the production of the positive electrode.

Example 4

In Example 4, a nonaqueous electrolyte battery of Example 4 was produced in the same procedure as in Example 1 except that the coating amount of the slurry was 67 g/m² per unit area of the positive electrode in the production of the positive electrode.

Example 5

In Example 5, a nonaqueous electrolyte battery of Example 5 was manufactured by a procedure similar to that in Example 1 except that a negative electrode was produced by the following procedure.

First, in Example 5, a powder of orthorhombic Na-containing niobium titanium composite oxide $Li_2Na_{1.9}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 1 except that raw materials were mixed such that the molar ratio of Li:Na:Ti:Nb of the mixture was 2:1.9:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 6

In Example 6, a nonaqueous electrolyte battery of Example 6 was manufactured by a procedure similar to that in Example 1 except that a negative electrode was produced by the following procedure.

First, in Example 6, a powder of orthorhombic Na-containing niobium titanium composite oxide $Li_{2.1}Na_{1.8}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 1 except that raw materials were mixed such that the molar ratio of Li:Na:Ti:Nb of the mixture was 2.1:1.8:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 7

In Example 7, a nonaqueous electrolyte battery of Example 7 was manufactured by a procedure similar to that in Example 1 except that a negative electrode was produced by the following procedure.

First, in Example 7, a powder of orthorhombic Na-containing niobium titanium composite oxide $Li_2Na_{1.5}Ti_{5.5}Nb_{0.5}O_{14}$ was used as a negative electrode active material. This powder was synthesized in the same manner as the synthesis procedure of the powder of orthorhombic Na-containing niobium titanium composite oxide used in Example 1 except that raw materials were mixed such that the molar ratio of Li:Na:Ti:Nb of the mixture was 2:1.5:5.5:0.5.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 8

In Example 8, a nonaqueous electrolyte battery of Example 8 was manufactured by a procedure similar to that in Example 1 except that a negative electrode was produced by the following procedure.

First, in Example 8, a powder of orthorhombic Na-containing niobium titanium composite oxide $Li_{2.2}Na_{1.3}Ti_{5.5}Nb_{0.5}O_{14}$ was used as a negative electrode active material. This powder was synthesized in the same manner as the synthesis procedure of the powder of orthorhombic Na-containing niobium titanium composite oxide used in Example 1 except that raw materials were mixed such that the molar ratio of Li:Na:Ti:Nb of the mixture was 2.2:1.3:5.5:0.5.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 9

In Example 9, a nonaqueous electrolyte battery of Example 9 was manufactured by a procedure similar to that in Example 1 except that a negative electrode was produced by the following procedure.

First, in Example 9, a powder of orthorhombic Na-containing niobium titanium composite oxide $Li_2Na_{1.2}Ti_{5.2}Nb_{0.8}O_{14}$ was used as a negative electrode active material. This powder was synthesized in the same manner as the synthesis procedure of the powder of orthorhombic Na-containing niobium titanium composite oxide used in Example 1 except that raw materials were mixed such that the molar ratio of Li:Na:Ti:Nb of the mixture was 2:1.2:5.2:0.8.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 10

In Example 10, a nonaqueous electrolyte battery of Example 10 was manufactured by a procedure similar to that in Example 1 except that a negative electrode was produced by the following procedure.

First, in Example 10, a powder of orthorhombic Na-containing niobium titanium composite oxide $Li_2NaSr_{0.5}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 1 except that a powder of strontium nitrate $Sr(NO_3)_2$ was further used as a raw material and raw materials were mixed such that the molar ratio of Li:Na:Sr:Ti:Nb of the mixture was 2:1:0.5:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 11

In Example 11, a nonaqueous electrolyte battery of Example 11 was manufactured by a procedure similar to that in Example 1 except that a negative electrode was produced by the following procedure.

First, in Example 11, a powder of orthorhombic Na-containing niobium titanium composite oxide $Li_2Na_{1.5}Sr_{0.2}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 10 except that raw materials were mixed such that the molar ratio of Li:Na:Sr:Ti:Nb of the mixture was 2:1.5:0.2:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 12

In Example 12, a nonaqueous electrolyte battery of Example 12 was manufactured by a procedure similar to that in Example 1 except that a negative electrode was produced by the following procedure.

First, in Example 12, a powder of orthorhombic Na-containing niobium titanium composite oxide $Li_2Na_{1.5}Mg_{0.2}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 1 except that a powder of magnesium acetate $Mg(CH_3COO)_2$ was further used as a raw material and raw materials were mixed such that the molar ratio of Li:Na:Mg:Ti:Nb of the mixture was 2:1.5:0.2:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 13

In Example 13, a nonaqueous electrolyte battery of Example 13 was manufactured by a procedure similar to that in Example 1 except that a negative electrode was produced by the following procedure.

First, in Example 13, a powder of orthorhombic Na-containing niobium titanium composite oxide $Li_2Na_{1.5}Ba_{0.2}Ti_{5.9}Nb_{0.1}O_{14}$ was used as a negative electrode active material. This powder was synthesized in the same manner as the synthesis procedure of the powder of orthorhombic Na-containing niobium titanium composite oxide used in Example 1 except that a powder of barium carbonate $BaCO_3$ was further used as a raw material and raw materials were mixed such that the molar ratio of Li:Na:Ba:Ti Nb of the mixture was 2:1.5:0.2:5.9:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 14

In Example 14, a nonaqueous electrolyte battery of Example 14 was manufactured by a procedure similar to that in Example 1 except that a negative electrode was produced by the following procedure.

First, in Example 14, a powder of orthorhombic Na-containing niobium titanium composite oxide $Li_2Na_{1.5}Ba_{0.2}Ti_{5.5}Nb_{0.5}O_{14}$ was used as a negative electrode active material. This powder was synthesized in the same manner as the synthesis procedure of the powder of orthorhombic Na-containing niobium titanium composite oxide used in Example 13 except that raw materials were mixed such that the molar ratio of Li:Na:Ba:Ti:Nb of the mixture was 2:1.5:0.2:5.5:0.5.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 15

In Example 15, a nonaqueous electrolyte battery of Example 15 was manufactured by a procedure similar to that in Example 1 except that a negative electrode was produced by the following procedure.

First, in Example 15, a powder of orthorhombic Na-containing niobium titanium composite oxide $Li_2Na_{1.9}Ti_{5.7}Nb_{0.1}Al_{0.2}O_{14}$ was used as a negative electrode active material. This powder was synthesized in the same manner as the synthesis procedure of the powder of orthorhombic Na-containing niobium titanium composite oxide used in Example 1 except that a powder of aluminum oxide $Al_2O_3$ was further used as a raw material and raw materials were mixed such that the molar ratio of Li:Na:Ti:Nb:Al of the mixture was 2:1.9:5.7:0.1:0.2.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 16

In Example 16, a nonaqueous electrolyte battery of Example 16 was manufactured by a procedure similar to that in Example 1 except that a negative electrode was produced by the following procedure.

First, in Example 16, a powder of orthorhombic Na-containing niobium titanium composite oxide $Li_2Na_{1.9}Ti_{5.8}Nb_{0.1}Zr_{0.1}O_{14}$ was used as a negative electrode active material. This powder was synthesized in the same manner as the synthesis procedure of the powder of orthorhombic Na-containing niobium titanium composite oxide used in Example 1 except that a powder of zirconium oxide $ZrO_2$ was further used as a raw material and raw materials were mixed such that the molar ratio of Li:Na:Ti:Nb:Zr of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 17

In Example 17, a nonaqueous electrolyte battery of Example 17 was manufactured by a procedure similar to that in Example 1 except that a negative electrode was produced by the following procedure.

First, in Example 17, a powder of orthorhombic Na-containing niobium titanium composite oxide $Li_2Na_{1.9}Ti_{5.8}Nb_{0.1}Sn_{0.1}O_{14}$ was used as a negative electrode active material. This powder was synthesized in the same manner as the synthesis procedure of the powder of orthorhombic Na-containing niobium titanium composite oxide used in Example 1 except that a powder of tin oxide $SnO_2$ was further used as a raw material and raw materials were mixed such that the molar ratio of Li:Na:Ti:Nb:Sn of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 18

In Example 18, a nonaqueous electrolyte battery of Example 18 was manufactured by a procedure similar to that in Example 1 except that a negative electrode was produced by the following procedure.

First, in Example 18, a powder of orthorhombic Na-containing niobium titanium composite oxide $Li_{2.1}Na_{1.9}Ti_{5.8}Nb_{0.1}Ta_{0.1}O_{14}$ was used as a negative electrode active material. This powder was synthesized in the same manner as the synthesis procedure of the powder of orthorhombic Na-containing niobium titanium composite oxide used in Example 1 except that a powder of tantalum (V) oxide $Ta_2O_5$ was further used as a raw material and raw materials were mixed such that the molar ratio of Li:Na:Ti:Nb:Ta of the mixture was 2.1:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 19

In Example 19, a nonaqueous electrolyte battery of Example 19 was manufactured by a procedure similar to that in Example 1 except that a negative electrode was produced by the following procedure.

First, in Example 19, a powder of orthorhombic Na-containing niobium titanium composite oxide $Li_{2.1}Na_{1.9}Ti_{5.8}Nb_{0.1}V_{0.1}O_{14}$ was used as a negative electrode active material. This powder was synthesized in the same manner as the synthesis procedure of the powder of orthorhombic Na-containing niobium titanium composite oxide used in Example 1 except that a powder of vanadium oxide (V)$V_2O_5$ was further used as a raw material and raw materials were mixed such that the molar ratio of Li:Na:Ti:Nb:V of the mixture was 2.1:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 20

In Example 20, a nonaqueous electrolyte battery of Example 20 was manufactured by a procedure similar to that in Example 1 except that a negative electrode was produced by the following procedure.

First, in Example 20, a powder of orthorhombic Na-containing niobium titanium composite oxide $Li_2Na_{1.9}Ti_{5.8}Nb_{0.1}Fe_{0.1}O_{14}$ was used as a negative electrode active material. This powder was synthesized in the same manner as the synthesis procedure of the powder of orthorhombic Na-containing niobium titanium composite oxide used in Example 1 except that a powder of iron (III) oxide $Fe_2O_3$ was further used as a raw material and raw materials were mixed such that the molar ratio of Li:Na:Ti:Nb:Fe of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a

Example 21

In Example 21, a nonaqueous electrolyte battery of Example 21 was manufactured by a procedure similar to that in Example 1 except that a negative electrode was produced by the following procedure.

First, in Example 21, a powder of orthorhombic Na-containing niobium titanium composite oxide $Li_2Na_{1.9}Ti_{5.8}Nb_{0.1}Co_{0.1}O_{14}$ was used as a negative electrode active material. This powder was synthesized in the same manner as the synthesis procedure of the powder of orthorhombic Na-containing niobium titanium composite oxide used in Example 1 except that a powder of cobalt oxide $Co_3O_4$ was further used as a raw material and raw materials were mixed such that the molar ratio of Li:Na:Ti:Nb:Co of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 22

In Example 22, a nonaqueous electrolyte battery of Example 22 was manufactured by a procedure similar to that in Example 1 except that a negative electrode was produced by the following procedure.

First, in Example 22, a powder of orthorhombic Na-containing niobium titanium composite oxide $Li_2Na_{1.9}Ti_{5.8}Nb_{0.1}Mn_{0.1}O_{14}$ was used as a negative electrode active material. This powder was synthesized in the same manner as the synthesis procedure of the powder of orthorhombic Na-containing niobium titanium composite oxide used in Example 1 except that a powder of manganese oxide $Mn_3O_4$ was further used as a raw material and raw materials were mixed such that the molar ratio of Li:Na:Ti:Nb:Mn of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed.

Thus, a negative electrode having an electrode density (excluding current collector) of 2.3 g/cm³ was produced.

Example 23

In Example 23, a nonaqueous electrolyte battery of Example 23 was manufactured by a procedure similar to that in Example 1 except that a negative electrode was produced by the following procedure.

First, in Example 23, a powder of orthorhombic Na-containing niobium titanium composite oxide $Li_2Na_{1.9}Ti_{5.8}Nb_{0.1}Mo_{0.1}O_{14}$ was used as a negative electrode active material. This powder was synthesized in the same manner as the synthesis procedure of the powder of orthorhombic Na-containing niobium titanium composite oxide used in Example 1 except that a powder of molybdenum oxide $MoO_3$ was further used as a raw material and raw materials were mixed such that the molar ratio of Li:Na:Ti:Nb:Mo of the mixture was 2:1.9:5.8:0.1:0.1.

Then, a slurry was prepared in the same procedure as in Example 1 except that this powder was used.

Then, the prepared slurry was coated onto both surfaces of a current collector formed of an aluminum foil having a thickness of 15 μm. The coating amount per unit area was 100 g/m². Then, the coating was dried and pressed. Thus, a negative electrode having an electrode density (excluding current collector) of 2.3 g/cm³ was produced.

Example 24

In Example 24, a nonaqueous electrolyte battery of Example 24 was manufactured by a procedure similar to that in Example 1 except that a positive electrode was produced by the following procedure.

First, in Example 24, lithium nickel cobalt manganese composite oxide $LiNi_{0.33}Co_{0.33}Mn_{0.33}O_2$ was used as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 3.0 g/cm³ was produced.

Example 25

In Example 25, a nonaqueous electrolyte battery of Example 25 was manufactured by a procedure similar to that in Example 1 except that a positive electrode was produced by the following procedure.

First, in Example 25, lithium cobaltate $LiCoO_2$ was used as the positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 3.0 g/cm³ was produced.

Example 26

In Example 26, a nonaqueous electrolyte battery of Example 26 was manufactured by a procedure similar to that in Example 1 except that a positive electrode was produced by the following procedure.

First, in Example 26, lithium nickel cobalt manganese composite oxide $LiNi_{0.5}Co_{0.2}Mn_{0.3}O_2$ was used as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/m². Then, the coating was dried and pressed; Thus, a positive electrode having an electrode density (excluding current collector) of 3.0 g/cm³ was produced.

Example 27

In Example 27, a nonaqueous electrolyte battery of Example 27 was manufactured by a procedure similar to that in Example 1 except that a positive electrode was produced by the following procedure.

First, in Example 27, lithium nickel cobalt manganese composite oxide $LiNi_{0.6}Co_{0.2}Mn_{0.2}O_2$ was used as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/rn². Then, the coating was dried and pressed. Thus, a positive electrode having an electrode density (excluding current collector) of 3.0 g/cm³ was produced.

Example 28

In Example 28, a nonaqueous electrolyte battery of Example 28 was manufactured by a procedure similar to that in Example 1 except that a positive electrode was produced by the following procedure.

First, in Example 28, lithium nickel cobalt manganese composite oxide $LiNi_{0.8}Co_{0.1}Mn_{0.1}O_2$ was used as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/m². Then, the coating was dried and pressed. Thus, a positive electrode having an electrode density (excluding current collector) of 3.0 g/cm³ was produced.

Example 29

In Example 29, a nonaqueous electrolyte battery of Example 29 was manufactured by a procedure similar to that in Example 1 except that a positive electrode was produced by the following procedure.

First, in Example 29, lithium phosphorus oxide $LiMn_{0.85}Fe_{0.1}Mg_{0.05}PO_4$ having an olivine structure was used as a positive electrode active material. This composite oxide, acetylene black as a conductive agent, and polyvinylidene fluoride (PVdF) as a binder were put into N-methyl pyrrolidone (NMP) as a solvent in a mixing ratio of 90% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/m². Then, the coating was dried and pressed. Thus, a positive electrode having an electrode density (including no current collector) of 2.0 g/cm³ was produced.

Example 30

In Example 30, a nonaqueous electrolyte battery of Example 30 was manufactured by a procedure similar to that in Example 1 except that a positive electrode was produced by the following procedure.

First, in Example 30, a mixture of lithium nickel cobalt manganese composite oxide $LiNi_{0.33}Co_{0.33}Mn_{0.33}O_2$ and lithium cobaltate $LiCoO_2$ was used as a positive electrode active material. A powder of $LiNi_{0.33}Co_{0.33}Mn_{0.33}O_2$, a powder of $LiCoO_2$, acetylene black as a conductive agent, and polyvinylidene fluoride (PVdF) as a binder were put into N-methyl pyrrolidone (NMP) as a solvent in a mixing ratio of 72% by mass:18% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/m². Then, the coating was dried and pressed. Thus, a positive electrode having an electrode density (excluding current collector) of 3.0 g/cm³ was produced.

Example 31

In Example 31, a nonaqueous electrolyte battery of Example 31 was manufactured by a procedure similar to that in Example 1 except that a positive electrode was produced by the following procedure.

First, in Example 31, a mixture of lithium nickel cobalt manganese composite oxide $LiNi_{0.33}Co_{0.33}Mn_{0.33}O_2$ and lithium cobaltate $LiCoO_2$ was used as a positive electrode active material. A powder of $LiNi_{0.33}Co_{0.33}Mn_{0.33}O_2$, a powder of $LiCoO_2$, acetylene black as a conductive agent, and polyvinylidene fluoride (PVdF) as a binder were put into N-methyl pyrrolidone (NMP) as a solvent in a mixing ratio of 45% by mass:45% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 µm. The coating amount per unit area was 91 g/m². Then, the coating was dried and pressed. Thus, a positive electrode having an electrode density (excluding current collector) of 3.0 g/cm³ was produced.

Example 32

In Example 32, a nonaqueous electrolyte battery of Example 32 was manufactured by a procedure similar to that in Example 1 except that a positive electrode was produced by the following procedure.

First, in Example 32, a mixture of spinel-type lithium manganese composite oxide $LiAl_{0.1}Mn_{1.9}O_4$ and lithium nickel cobalt manganese composite oxide $LiNi_{0.33}Co_{0.33}Mn_{0.33}O_2$ was used as a positive electrode active material. A powder of $LiAl_{0.1}Mn_{1.9}O_4$, a powder of $LiNi_{0.33}Co_{0.33}Mn_{0.33}O_2$, acetylene black as a conductive agent, and polyvinylidene fluoride (PVdF) as a binder were put into N-methyl pyrrolidone (NMP) as a solvent in a mixing ratio of 72% by mass:18% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 2.8 g/cm³ was produced.

Example 33

In Example 33, a nonaqueous electrolyte battery of Example 33 was manufactured by a procedure similar to that in Example 1 except that a positive electrode was produced by the following procedure.

First, in Example 33, a mixture of spinel-type lithium manganese composite oxide $LiAl_{0.1}Mn_{1.9}O_4$ and lithium nickel cobalt manganese composite oxide $LiNi_{0.33}Co_{0.33}Mn_{0.33}O_2$ was used as a positive electrode active material. A powder of $LiAl_{0.1}Mn_{1.9}O_4$, a powder of $LiNi_{0.33}Co_{0.33}Mn_{0.33}O_2$, acetylene black as a conductive agent, and polyvinylidene fluoride (PVdF) as a binder were put into N-methyl pyrrolidone (NMP) as a solvent in a mixing ratio of 45% by mass:45% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 2.8 g/cm³ was produced.

Example 34

In Example 34, a nonaqueous electrolyte battery of Example 34 was manufactured by a procedure similar to that in Example 1 except that a positive electrode was produced by the following procedure.

First, in Example 34, a mixture of spinel-type lithium manganese composite oxide $LiAl_{0.1}Mn_{1.9}O_4$ and lithium cobaltate $LiCoO_2$ was used as a positive electrode active material. A powder of $LiAl_{0.1}Mn_{1.9}O_4$, a powder of $LiCoO_2$, acetylene black as a conductive agent, and polyvinylidene fluoride (PVdF) as a binder were put into N-methyl pyrrolidone (NMP) as a solvent in a mixing ratio of 72% by mass:18% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 2.8 g/cm³ was produced.

Example 35

In Example 35, a nonaqueous electrolyte battery of Example 35 was manufactured by a procedure similar to that in Example 1 except that a positive electrode was produced by the following procedure.

First, in Example 35, a mixture of lithium phosphorus oxide $LiMn_{0.85}Fe_{0.1}Mg_{0.05}PO_4$ having an olivine structure and spinel-type lithium manganese composite oxide $LiAl_{0.1}Mn_{1.9}O_4$ was used as a positive electrode active material. A powder of $LiMn_{0.85}Fe_{0.1}Mg_{0.05}PO_4$, a powder of $LiAl_{0.1}Mn_{1.9}O_4$ black as a conductive agent, and polyvinylidene fluoride (PVdF) as a binder were put into N-methyl pyrrolidone (NMP) as a solvent in a mixing ratio of 45% by mass:45% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed. Thus, a positive electrode having an electrode density (excluding current collector) of 2.3 g/cm³ was produced.

Example 36

In Example 36, a nonaqueous electrolyte battery of Example 36 was manufactured by a procedure similar to that in Example 1 except that a positive electrode was produced by the following procedure.

First, in Example 36, a mixture of lithium phosphorus oxide $LiMn_{0.85}Fe_{0.1}Mg_{0.05}PO_4$ having an olivine structure and spinel-type lithium manganese composite oxide $LiAl_{0.1}Mn_{1.9}O_4$ was used as a positive electrode active material. A powder of $LiMn_{0.85}Fe_{0.1}Mg_{0.05}PO_4$, a powder of $LiAl_{0.1}Mn_{1.9}O_4$, acetylene black as a conductive agent, and polyvinylidene fluoride (PVdF) as a binder were put into N-methyl pyrrolidone (NMP) as a solvent in a mixing ratio of 72% by mass:18% by mass:5% by mass:5% by mass and mixed. Subsequently, the mixture thus obtained was dispersed using a planetary centrifugal mixer to prepare a slurry.

Then, the prepared slurry was coated onto both surfaces of a current collector formed of an aluminum foil having a thickness of 15 μm. The coating amount per unit area was 91 g/m². Then, the coating was dried and pressed.

Thus, a positive electrode having an electrode density (including no current collector) of 2.2 g/cm³ was produced.

Comparative Example 1

In Comparative Example 1, a nonaqueous electrolyte battery of Comparative Example 1 was produced in the same procedure as in Example 1 except that the coating amount of the slurry was 112 g/m² per unit area of the positive electrode in the production of the positive electrode.

Comparative Example 2

In Comparative Example 2, a nonaqueous electrolyte battery of Comparative Example 2 was produced in the same procedure as in Example 1 except that the coating amount of the slurry was 63 g/m² per unit area of the positive electrode in the production of the positive electrode.

Comparative Example 3

In Comparative Example 3, a nonaqueous electrolyte battery of Comparative Example 3 was produced in the same procedure as in Example 2 except that a powder of lithium titanate $Li_4Ti_5O_{12}$ having a spinel-type crystal structure was used as a negative electrode active material in the production of the negative electrode.

Comparative Example 4

In Comparative Example 4, a nonaqueous electrolyte battery of Comparative Example 4 was produced in the same procedure as in Example 3 except that a powder of lithium titanate $Li_4Ti_5O12$ having a spinel-type crystal structure was used as a negative electrode active material in the production of the negative electrode.

Comparative Example 5

In Comparative Example 5, a nonaqueous electrolyte battery of Comparative Example 5 was produced in the same procedure as in Example 4 except that a powder of lithium titanate $Li_4Ti_5O_{12}$ having a spinel-type crystal structure was used as a negative electrode active material in the production of the negative electrode.

Comparative Example 6

In Comparative Example 6, a nonaqueous electrolyte battery of Comparative Example 6 was produced in the same procedure as in Example 1 except that a powder of composite oxide $Li_2MgTi_6O_{14}$ was used as a negative electrode active material in the production of the negative electrode.

Comparative Example 7

In Comparative Example 7, a nonaqueous electrolyte battery of Comparative Example 7 was produced in the same procedure as in Example 1 except that a powder of composite oxide $Li_2CaTi_6O_{14}$ was used as a negative electrode active material in the production of the negative electrode.

Comparative Example 8

In Comparative Example 8, a nonaqueous electrolyte battery of Comparative Example 8 was produced in the same procedure as in Example 1 except that composite oxide $Li_2Na_{1.95}Ti_{5.95}Nb_{0.05}O_{14}$ was used as a negative electrode active material in the production of the negative electrode.

Comparative Example 9

In Comparative Example 9, a nonaqueous electrolyte battery of Comparative Example 9 was produced in the same procedure as in Example 1 except that composite oxide $Li_2NaTi_5NbO_{14}$ was used as a negative electrode active material in the production of the negative electrode.

[Evaluation]

Each of the nonaqueous electrolyte batteries of Examples 1 to 36 and Comparative Examples 1 to 9 was evaluated by the following procedure.

[Pulse Resistance Test]

Each battery produced as described above was adjusted to a state-of-charge (SOC) of 80% by the following procedure.

First, the battery was discharged at a constant current of 0.2 C under the environment of 25° C. until a battery voltage reached 1.5 V. As a result, the SOC of the battery was set to 0%.

Subsequently, the battery was charged at a constant current of 0.2 C up to 80% of the battery capacity. Thus, the SOC of each battery was adjusted to 80%. After the adjustment, each battery was left in an open circuit state for one hour or more.

Subsequently, each battery was subjected to an input-and-output pulse test in the following procedure.

First, the battery was discharged at a constant current of 0.2 C for 10 seconds. A resistance value $R_{0.2C(output)}$ at that time was measured. Thereafter, the SOC of each battery was adjusted to 80% in the same procedure as above, and each battery was held in the open circuit state for one hour. Subsequently, the battery was discharged at a constant current of 5 C for 10 seconds. A resistance value $R_{5C(output)}$ at that time was measured. A ratio $R_{5C(output)}/R_{0.2C(output)}$ was calculated.

Then, the SOC of each battery was adjusted to 80% in the same procedure as above, and each battery was held in the open circuit state for one hour. Subsequently, the battery was charged at a constant current of 0.2 C for 10 seconds. A resistance value $R_{0.2C(output)}$ at that time was measured. Thereafter, the SOC of each battery was adjusted to 80% in the same procedure as above, and each battery was held in the open circuit state for one hour. Subsequently, the battery was charged at a constant current of 5 C for 10 seconds. A resistance value $R_{5C(input)}$ at that time was measured. A ratio $R_{5C(input)}/R_{0.2C(input)}$ was calculated.

Tables 1 and 2 show the ratio $R_{5C(output)}/R_{5C(output)}$, the ratio $R_{5C(input)}/R_{0.2C(input)}$, and the energy density of each of the nonaqueous electrolyte batteries of Examples 1 to 36 and Comparative Examples 1 to 9.

TABLE 1

| | $R_{5\ C(output)}/R_{0.2\ C(output)}$ | $R_{5\ C(input)}/R_{0.2\ C(input)}$ | Energy Density [Wh/L] |
|---|---|---|---|
| Example 1 | 1.8 | 1.9 | 128 |
| Example 2 | 2 | 2.2 | 135 |
| Example 3 | 1.6 | 1.6 | 100 |
| Example 4 | 1.5 | 1.5 | 88 |
| Example 5 | 2.1 | 2.4 | 108 |
| Example 6 | 2.1 | 2.4 | 108 |
| Example 7 | 1.5 | 1.6 | 128 |
| Example 8 | 1.4 | 1.6 | 128 |
| Example 9 | 1.6 | 1.9 | 125 |
| Example 10 | 2.2 | 2.2 | 126 |
| Example 11 | 2 | 2.3 | 124 |
| Example 12 | 2 | 2.2 | 124 |
| Example 13 | 2 | 2.2 | 124 |
| Example 14 | 2.1 | 2.3 | 128 |
| Example 15 | 2.1 | 2.3 | 123 |
| Example 16 | 2 | 2.3 | 124 |
| Example 17 | 2.1 | 2.3 | 124 |
| Example 18 | 2.1 | 2.4 | 124 |
| Example 19 | 2 | 2.3 | 124 |
| Example 20 | 2 | 2.2 | 124 |
| Example 21 | 2 | 2.2 | 124 |
| Example 22 | 2 | 2.3 | 124 |
| Example 23 | 2 | 2.2 | 124 |

TABLE 2

| | $R_{5\ C(output)}/R_{0.2\ C(output)}$ | $R_{5\ C(input)}/R_{0.2\ C(input)}$ | Energy Density [Wh/L] |
|---|---|---|---|
| Example 24 | 1.8 | 2 | 130 |
| Example 25 | 1.7 | 1.8 | 135 |
| Example 26 | 1.9 | 2.1 | 127 |
| Example 27 | 1.9 | 2.1 | 126 |
| Example 28 | 1.9 | 2.2 | 124 |
| Example 29 | 1.9 | 2.3 | 138 |
| Example 30 | 1.8 | 2 | 132 |
| Example 31 | 1.7 | 1.9 | 133 |
| Example 32 | 1.6 | 1.8 | 122 |
| Example 33 | 1.7 | 1.9 | 125 |
| Example 34 | 1.7 | 1.9 | 124 |
| Example 35 | 1.8 | 2.1 | 134 |

TABLE 2-continued

|  | $R_{5\ C(output)}/R_{0.2\ C(output)}$ | $R_{5\ C(input)}/R_{0.2\ C(input)}$ | Energy Density [Wh/L] |
|---|---|---|---|
| Example 36 | 1.9 | 2.2 | 136 |
| Comparative Example 1 | 2.3 | 2.8 | 140 |
| Comparative Example 2 | 2.1 | 2 | 80 |
| Comparative Example 3 | 2 | 2.1 | 112 |
| Comparative Example 4 | 2 | 2.1 | 90 |
| Comparative Example 5 | 2 | 2.1 | 78 |
| Comparative Example 6 | 2.4 | 2.5 | 110 |
| Comparative Example 7 | 2.5 | 2.5 | 110 |
| Comparative Example 8 | 2.5 | 2.9 | 104 |
| Comparative Example 9 | 2.3 | 2.8 | 107 |

[Measurement of Mass Ratio A/C]

The mass ratio A/C of each of the nonaqueous electrolyte batteries of Examples 1 to 36 and Comparative Examples 1 to 9 was measured according to the procedure described above.

The following Tables 3 and 4 show the mass ratio A/C of each nonaqueous electrolyte battery, the electrode capacity $C_C$ of the positive electrode, and the electrode capacity $C_A$ of the negative electrode.

TABLE 3

|  | Mass Ratio A/C | Electrode Capacity $C_C$ [mAh/cm$^2$] | Electrode Capacity $C_A$ [mAh/cm$^2$] |
|---|---|---|---|
| Example 1 | 1.05 | 1 | 1.1 |
| Example 2 | 0.95 | 1.08 | 1.1 |
| Example 3 | 1.3 | 0.8 | 1.1 |
| Example 4 | 1.5 | 0.7 | 1.1 |
| Example 5 | 1.05 | 1 | 0.95 |
| Example 6 | 1.05 | 1 | 0.95 |
| Example 7 | 1.05 | 1 | 1.2 |
| Example 8 | 1.05 | 1 | 1.2 |
| Example 9 | 1.05 | 1 | 1.05 |
| Example 10 | 1.05 | 1 | 1.1 |
| Example 11 | 1.05 | 1 | 1.05 |
| Example 12 | 1.05 | 1 | 1.04 |
| Example 13 | 1.05 | 1 | 1.04 |
| Example 14 | 1.05 | 1 | 1.1 |
| Example 15 | 1.05 | 1 | 1.02 |
| Example 16 | 1.05 | 1 | 1.02 |
| Example 17 | 1.05 | 1 | 1.02 |
| Example 18 | 1.05 | 1 | 1.02 |
| Example 19 | 1.05 | 1 | 1.02 |
| Example 20 | 1.05 | 1 | 1.02 |
| Example 21 | 1.05 | 1 | 1.02 |
| Example 22 | 1.05 | 1 | 1.02 |
| Example 23 | 1.05 | 1 | 1.02 |

TABLE 4

|  | Mass Ratio A/C | Electrode Capacity $C_C$ [mAh/cm$^2$] | Electrode Capacity $C_A$ [mAh/cm$^2$] |
|---|---|---|---|
| Example 24 | 1.1 | 1.3 | 1.1 |
| Example 25 | 1.1 | 1.3 | 1.1 |
| Example 26 | 1.1 | 1.4 | 1.1 |
| Example 27 | 1.1 | 1.42 | 1.1 |
| Example 28 | 1.1 | 1.5 | 1.1 |
| Example 29 | 1.1 | 1.23 | 1.1 |
| Example 30 | 1.1 | 1.3 | 1.1 |
| Example 31 | 1.1 | 1.3 | 1.1 |
| Example 32 | 1.1 | 1 | 1.1 |
| Example 33 | 1.1 | 1.13 | 1.1 |
| Example 34 | 1.1 | 1 | 1.1 |
| Example 35 | 1.1 | 1.08 | 1.1 |
| Example 36 | 1.1 | 1.17 | 1.1 |
| Comparative Example 1 | 0.9 | 1.16 | 1.1 |
| Comparative Example 2 | 1.6 | 0.65 | 1.1 |
| Comparative Example 3 | 0.95 | 1.08 | 1.45 |
| Comparative Example 4 | 1.3 | 0.8 | 1.45 |
| Comparative Example 5 | 1.5 | 0.7 | 1.45 |
| Comparative Example 6 | 1.05 | 1 | 1 |
| Comparative Example 7 | 1.05 | 1 | 1 |
| Comparative Example 8 | 1.05 | 1 | 0.85 |
| Comparative Example 9 | 1.05 | 1 | 0.9 |

Comparison of the results of Examples 1 to 4 and Comparative Examples 1 and 2 shown in Tables 1 to 4 reveals that the nonaqueous electrolyte batteries of Examples 1 to 4 in which the mass ratio A/C was from 0.95 to 1.5 can exhibit a higher energy density than the nonaqueous electrolyte battery of Comparative Example 2 and, at the same time, can exhibit more excellent input-and-output characteristics than the nonaqueous electrolyte battery of Comparative Example 1 in a high SOC. This is because in the nonaqueous electrolyte batteries of Examples 1 to 4, it was possible to prevent the negative electrode containing orthorhombic Na-containing niobium titanium composite oxide from entering a high resistance state.

Comparison of the results of Examples 1 and 5 to 9 and Comparative Examples 8 and 9 reveals that the nonaqueous electrolyte batteries of Examples 1 and 5 to 9 in which y is in the range of from 0.1 to 0.8 in the general formula $Li_{2+v}Na_{2-y}M1_xTi_{6-y-z}Nb_yM2_zO_{14+\delta}$ can exhibit more excellent input-and-output characteristics than the nonaqueous electrolyte battery of Comparative Examples 8 and 9 in a high SOC. This is because, the content of Nb was determined such that the value of y fell within the above range, and the mass ratio A/C was from 0.95 to 1.5, whereby it was possible to prevent the negative electrode from entering a high resistance state even in a high SOC.

The results of Example 1 and Examples 10 to 23 reveal that even when M1 and/or M2 in orthorhombic Na-containing niobium titanium composite oxide is changed, it is possible to suppress increase in resistance in a high SOC, and, at the same time, a high energy density can be exhibited. In particular, when Mg, Ba, Fe, Co or Mo was used, lower input-and-output resistance could be exhibited. It is found that among Examples 10 to 13 and 15 to 23 in which the amount y of Nb is 0.1, the highest energy density is obtained in Example 10 using orthorhombic Na-containing niobium titanium composite oxide containing Sr.

Examples 24 to 36 are nonaqueous electrolyte batteries with different positive electrode active materials. It is found that among the positive electrode active materials, nonaqueous electrolyte batteries containing a large amount of spinel-type lithium manganese composite oxide as in Examples 32 and 34 provide a more excellent effect of lowering resistaince.

In Comparative Examples 3 to 5, $Li_4Ti_5O_{12}$ was used as a negative electrode active material. As is apparent from the results of Comparative Examples 3 to 5, when $Li_4Ti_5O_{12}$ was used as the negative electrode active material, improvement of the input-and-output characteristics could not be obtained even if the mass ratio A/C was from 0.95 to 1.5. This is probably because a resistance value of $Li_4Ti_5O_{12}$ does not change when the mass ratio A/C is in the range of from 0.95 to 1.5. In addition, only the energy density was changed by changing the mass ratio A/C, and the effect of lowering resistance could not be obtained. In the nonaqueous electrolyte batteries of Comparative Examples and 7 in which the composite oxide $Li_2MgTi_6O_{14}$ and the composite oxide $Li_2CaTi_6O_{14}$ were respectively used as the negative electrode active materials, although the mass ratio A/C was 1.05, the input-and-output characteristics were low. The result of the analysis revealed that in the negative electrodes included in these nonaqueous electrolyte batteries, a low resistance state and a high resistance state existed within the SOC range of 0 to 100%. On the other hand, it was found that the nonaqueous electrolyte batteries of Examples 1 to 36 could exhibit low resistance in a wide range of SOC.

According to one or more embodiments and Examples described above, a nonaqueous electrolyte battery is provided. The nonaqueous electrolyte battery includes a negative electrode containing a negative electrode active material which contains an orthorhombic Na-containing niobium titanium composite oxide, a positive electrode containing a positive electrode active material, and a nonaqueous electrolyte. The mass ratio A/C of the active materials satisfies the formula (1): 0.95≤A/C≤1.5. Even when the nonaqueous electrolyte battery enters a high state-of-charge, the negative electrode can be prevented from entering the high resistance state. In addition, the nonaqueous electrolyte battery can exhibit high energy density. Thus, the nonaqueous electrolyte battery can exhibit both excellent input-and-output characteristics and high energy density.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. A nonaqueous electrolyte battery, comprising:
a negative electrode comprising a negative electrode current collector and a negative electrode active material-containing layer provided on the negative electrode current collector, the negative electrode active material-containing layer comprising from 70% by mass to 96% by mass of a negative electrode active material, from 2% by mass to 28% by mass of a conductive material, and from 2% by mass to 28% by mass of a binder, the negative electrode active material consisting of an orthorhombic Na-containing niobium titanium composite oxide, the orthorhombic Na-containing niobium titanium composite oxide being represented by a general formula of $$Li_{2+v}Na_{2-y}M1_xTi_{6-y-z}Nb_yM2_zO_{14+\delta},$$

wherein M1 is at least one selected from the group consisting of Cs, K, Sr, Ba, and Ca, M2 is at least one selected from the group consisting of Zr, Sn, V, Ta, Mo, W, Fe, Co, Mn, and Al, and 0≤v<2, 0≤x<2, 0.1≤y≤0.8, 0≤z<3, and −0.5≤δ≤0.5;

a positive electrode comprising a positive electrode current collector and a positive electrode active material-containing layer provided on the positive electrode current collector, the positive electrode active material-containing layer comprising a positive electrode active material; and a nonaqueous electrolyte, wherein a mass C [g/m²] of the positive electrode active material per unit area of the positive electrode and a mass A [g/m²] of the negative electrode active material per unit area of the negative electrode satisfy formula (1):

$$0.95 \le A/C \le 1.5 \quad (1).$$

2. The battery of claim 1, wherein formula (2) is satisfied:

$$C_A > C_C \quad (2)$$

wherein the $C_C$ [mAh/cm²] is an electrode capacity per 1 cm² of the positive electrode, and the $C_A$ [MAh/cm²] is an electrode capacity per 1 cm² of the negative electrode.

3. The battery of claim 1, wherein the positive electrode active material comprises a composite oxide represented by a general formula of $Li_uMeO_2$, wherein Me is at least one selected from the group consisting of Ni, Co, and Mn, and 0≤u≤1.

4. The battery of claim 1, wherein the positive electrode active material comprises a lithium manganese composite oxide having a spinel-type structure.

5. The battery of claim 1, wherein the positive electrode active material comprises
a lithium manganese composite oxide having a spinel-type structure, and
a composite oxide represented by a general formula of $Li_uMeO_2$, wherein Me is at least one selected from the group consisting of Ni, Co, and Mn, and 0≤u≤1.

6. The battery of claim 1, wherein the positive electrode active material comprises
a lithium manganese composite oxide having a spinel-type structure, and
a lithium phosphorus oxide having an olivine structure.

7. A battery pack, comprising the battery of claim 1.

8. The pack of claim 7, comprising nonaqueous electrolyte batteries each of which is the nonaqueous electrolyte battery,
wherein the nonaqueous electrolyte batteries are electrically connected in series, in parallel, or in combination thereof.

* * * * *